(12) United States Patent
Inagawa et al.

(10) Patent No.: US 7,822,152 B2
(45) Date of Patent: Oct. 26, 2010

(54) SYMBOL TIMING DETECTION METHOD AND APPARATUS, AND PREAMBLE DETECTION METHOD AND APPARATUS

(75) Inventors: Osamu Inagawa, Kanagawa (JP); Junya Tsuchida, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 636 days.

(21) Appl. No.: 11/889,911

(22) Filed: Aug. 17, 2007

(65) Prior Publication Data

US 2008/0043886 A1 Feb. 21, 2008

(30) Foreign Application Priority Data

Aug. 18, 2006 (JP) .............................. 2006-222994

(51) Int. Cl.
 *H04L 27/06* (2006.01)
(52) U.S. Cl. ...................................... 375/343
(58) Field of Classification Search ................. 375/142, 375/143, 144, 148, 150, 152, 316, 343, 346; 455/63.1, 114.2, 278.1, 296; 704/216, 218, 704/237, 263; 708/5, 422, 813; 342/108, 342/145, 189, 378
See application file for complete search history.

(56) References Cited

U.S. PATENT DOCUMENTS 7,190,728 B2 * 3/2007 Kawada et al. .............. 375/259

2005/0220230 A1 * 10/2005 Fukuda ........................ 375/343
2006/0039453 A1 * 2/2006 Yamada ....................... 375/150

FOREIGN PATENT DOCUMENTS

JP 2005-39597 2/2005

OTHER PUBLICATIONS

Zhou et al. A New Symbol Timing Synchronization for OFDM Based WLANS Under Multipath Fading Channels, IEEE, 2004, p. 1210-1214.*

* cited by examiner

*Primary Examiner*—Sam K Ahn
(74) *Attorney, Agent, or Firm*—McGinn IP Law Group PLLC

(57) ABSTRACT

A symbol timing detection method, executed in a processor, is provided where, upon detecting a symbol timing from a received signal composed of a packet having a preamble with periodically allocated symbols placed at a head of data, correlation results indicating a correlation between the received signal and a fixed pattern of the preamble are obtained, a maximum value in the correlation results are updated and held, and a timing of the maximum value is determined as a symbol timing on a condition that a maximum value currently held by the correlation peak detection unit is not updated in a symbol timing determination period having a predetermined length from the timing and that a number of occurrences of a correlation result exceeding an error detection determination threshold is smaller than a predetermined number in an error detection determination period defined within the symbol timing determination period.

21 Claims, 18 Drawing Sheets

SYMBOL TIMING DETECTION METHOD AND APPARATUS, AND PREAMBLE DETECTION METHOD AND APPARATUS

BACKGROUND OF THE INVENTION

1. Field of the Invention

The present invention relates to a technique of detecting a symbol timing and a preamble in a burst communication system.

2. Description of Related Art

In the field of wireless communication, a burst communication system which treats signal data that is composed of a packet or the like under a particular criterion as one unit (burst or packet) is used. Such a packet or burst includes a preamble signal (which is also referred to hereinafter simply as a preamble) at its head. The preamble is composed of a synchronization portion for a frequency in use and a symbol timing synchronization portion for detecting the head of a transmitted symbol. When receiving such a packet, it is necessary to perform synchronization processing such as detection of a symbol timing or the like using a preamble. Because a preamble signal does not contain data to be transmitted (which is also referred to hereinafter as a payload), it is required to minimize the preamble for the synchronization processing in order to reduce the circuit size and increase the speed of the synchronization processing. For example, a preamble of an OFDM (Orthogonal Frequency Division Multiplex) packet is composed of a plurality of short symbols which are attached before a payload.

For the detection of a preamble in a receiver in OFDM, a technique disclosed in Japanese Unexamined Patent Application Publication No. 2005-039597 is known, for example. The technique seeks the correlation between a received OFDM packet and a prestored fixed preamble pattern and detects a peak value in the correlation result. Then, the technique measures the number of times when the peak value exceeds a boundary detection threshold, which is described later, and the cyclic period of the peak value to thereby determine the position of a short symbol. Using the determined position of the short symbol, when the correlation result of the position at which the next peak should appear does not exceed the boundary detection threshold, the technique detects the peak position which is immediately preceding the above position and which exceeds the boundary detection threshold as a boundary between a short symbol and a data area.

Although the boundary detection threshold is a fixed value in other techniques, the technique disclosed in Japanese Unexamined Patent Application Publication No. 2005-039597 uses a value that is obtained by multiplying a peak value in a correlation result by a coefficient smaller than 1 as the boundary detection threshold. It is thereby possible to detect a preamble without fail even when the level of a fixed received signal changes, thereby enabling the detection which does not depend on the receiving environment.

Because such a preamble detection method detects a preamble by confirming the periodicity of a symbol using a symbol timing, it is important to detect a symbol timing accurately.

As a UWB (Ultra Wide Band) communication method, there is MB-OFDM (Multiband-Orthogonal Frequency Division Multiplex). MB-OFDM is described in detail in Standard ECMA-368 High Rule Ultra Wideband PHY and MAC Standard (Http://www.ecma-international.org/publications/files/EC MA-ST/ECMA-368.pdf). The MB-OFDM system performs communication using frequency hopping among a plurality of frequency bands in order to achieve broadband communication with a low-transmission power, which are the characteristics of the UWB communication. The frequency hopping is one form of spread spectrum and it is a method of transmitting signals by switching a carrier wave frequency within a certain communication band at a given time interval, using a hopping sequence known to both transmitter and receiver.

In MB-OFDM, a preamble signal is also transmitted via frequency hopping. FIG. 17 shows an example of a preamble signal in a MB-OFDM packet. The preamble signal is composed of 24 symbols (S0 to S23) and transmitted via hopping among three frequency bands (frequency band 1, frequency band 2 and frequency band 3). A receiver synchronizes a received frequency with frequency hopping according to the hopping sequence, receives the symbol over three frequency bands and demodulates it. In order to synchronize with frequency hopping, it is necessary to make sure to detect a preamble which is transmitted via frequency hopping. For this reason, a receiver fixes a received frequency to a standby frequency band (e.g. the frequency band 1 shown in FIG. 17) at the start of receiving to establish symbol timing synchronization and then detects a preamble.

After detecting a preamble, the receiver starts frequency hopping and performs initial acquisition such as AGC (Automatic Gain Control), AFC (Automatic Frequency Control), and frame synchronization in the illustrated 24 symbols, using the preamble signal which is received after that. In the example of FIG. 17, if the number of symbols which is required for AGC, AFC and frame synchronization is nineteen (S5 to S23), the symbols which are available for symbol timing synchronization are only two: S0 and S3.

Thus, in the MB-OFDM system which performs frequency hopping, there is a limit to the number of symbols which are available for the detection of a preamble, and it is necessary to establish symbol timing synchronization with a small number of symbols.

The preamble detection technique which is disclosed in Japanese Unexamined Patent Application Publication No. 2005-039597 seeks the correlation between a fixed preamble pattern and a received signal and detects a peak value in the correlation result as a symbol timing. However, there is a possibility of error detection that a signal different from a preamble signal is detected as a preamble signal, which causes lower throughput of a receiver. This is described in detail hereinafter with reference to FIGS. 18 and 19.

FIG. 18 shows the concept of the technique of implementing the detection of a preamble by detecting a peak value in a correlation result between a fixed preamble pattern and a received signal. As shown in FIG. 18, the technique seeks the correlation with a fixed pattern for every received signal (burst packet 200 in FIG. 18) to obtain a correlation result 107. It then determines a peak value from the correlation result 107, using that the correlation result 107 becomes a peak value when a received signal and the fixed pattern match, that is, when they are synchronized. Specifically, the technique compares the correlation result 107 with a preset default peak detection threshold and detects the correlation result 107 which satisfies the conditions that it is larger than the default peak detection threshold, it is the maximum value in the correlation result 107 up to the present, and there is no larger correlation result 107 in a subsequent predetermined period (i.e. a detection window which is opened according to a symbol length, or a peak detection range in FIG. 18). Upon detection of the peak value, it ends the peak value detection by activating a peak detection end signal 103 in FIG. 18, assuming that symbol timing synchronization is established.

Because the peak value is detected at the timing B0 in the example of FIG. 18, the timing B0 is determined as a symbol timing.

After that, the technique opens a detection window at every position where a distance from B0 is a multiple of symbol length and compares the correlation result 107 at the position of each detection window (a boundary detection timing 105 in FIG. 18) with a boundary detection threshold (the multiplication product of a peak value by a predetermined coefficient, which is 0.5 in the example of FIG. 18).

Then, if the correlation result falls below the boundary detection threshold at a certain boundary detection timing 105, the technique obtains the boundary detection timing 105 which is immediately before the certain boundary detection timing 105 as a boundary timing between a preamble signal and data. In the example of FIG. 18, the correlation result 107 at the detection window positions B1 to B3 are greater than the boundary detection threshold, and the correlation result 107 at the position A falls below the boundary detection threshold. Thus, the timing B3, which is immediately before the timing A, is determined as a boundary between a preamble signal and data.

A detection result according to this technique is discussed hereinafter with reference to a received signal (a burst packet 300) shown in FIG. 19.

In this case, a receiver receives another signal (non-preamble signal in FIG. 19) prior to receiving a preamble signal. The correlation result 107 is determined for the non-preamble signal also. For example, consider the case where a peak value is detected at the timing C0. According to the above-described technique, a symbol timing is determined upon detection of the peak value. However, because the timing C0 is for the non-preamble signal, an incorrect symbol timing is determined, and the detection window is opened on the basis of the incorrect symbol timing. Accordingly, the comparison between the correlation result 107 and the boundary detection threshold is performed at the timings C1, C2, C3 and C4. Because the boundary detection threshold is also determined by the correlation result 107 at the timing C0, the timing C2 is determined as a boundary timing between a preamble signal and a payload when the correlation results at the timings C1 and C2 are greater than the boundary detection threshold and the correlation result at the timing C3 is smaller than the boundary detection threshold, thus resulting in error detection.

Further, because a received signal level can change upon deterioration of the receiving environment such as under multipath environment or before performing AGC, it is necessary to set a low default peak detection threshold in order to prevent the omission of detection of a peak value. Therefore, the correlation result which is larger than a default peak detection threshold is likely to appear in a non-preamble signal also, which causes the above problem.

Furthermore, because a peak value at a symbol timing which is determined from a non-preamble signal is not large enough with respect to the correlation result in the other timings, it is highly likely that the correlation results at the positions other than the true symbol positions D1 to D4 also exceed the boundary detection threshold which is set based on the peak value. In the example of FIG. 19, the correlation results at the timings C1 and C2, which are not symbol positions, exceed the correlation result at the timing C0, resulting in error detection of a preamble based on the misdetection of a periodicity.

In addition, once a symbol timing is determined, the above-described technique does not detect a peak value in the period other than detection windows (i.e. the interval between two adjacent boundary detection timings 105; e.g. between C1 and C2, between C2 and C3 etc. in FIG. 19). Accordingly, it is unable to correct the wrongly determined symbol timing C0 in spite of the fact that the correlation result 107 at the true symbol timing (i.e. the timing D1) is greater than the correlation result 107 at the timing C0.

As one approach to avoid the above problem, there is a technique of keep detecting a peak value in the period other than detection windows even after a symbol timing is determined so as to check if there is a correlation result which is greater than a correlation result at a symbol timing and, if it exists, performing update of a peak value and redetection of a symbol timing. However, because the chances for the checking are small in a received signal having a small number of symbols available for symbol timing synchronization like MB-OFDM, it is likely to fail to find the error detection of a symbol timing.

The error detection of a symbol timing leads to error detection of a preamble, which causes lower transmission throughput.

SUMMARY

In one embodiment, there is provided a symbol timing detection method. When detecting a symbol timing from a received signal which is composed of a packet having a preamble containing periodically allocated symbols that is placed at a head of data, the method sequentially obtains correlation results indicating a correlation between the received signal and a fixed pattern of the preamble, updates and holds a maximum value of the sequentially obtained correlation results, and then determines a timing of the maximum value as a symbol timing on condition that the currently held maximum value is not updated in a symbol timing determination period having a predetermined length from the timing and that the number of occurrences of a correlation result exceeding an error detection determination threshold is smaller than a predetermined number in an error detection determination period which is defined within the symbol timing determination period.

In another embodiment, there is provided a preamble detection method. The method detects a symbol timing according to the above symbol timing detection method and confirms a periodicity of a symbol in a periodicity confirmation window that is opened in accordance with a symbol length on the basis of the detected symbol timing, thereby executing detection of a preamble.

The above method may be embodied in apparatus, a system or a program, which are also effective as an embodiment of the present invention.

The technique according to the present invention can enhance the accuracy of symbol timing detection and thereby increase the accuracy of preamble detection in a burst communication system.

BRIEF DESCRIPTION OF THE DRAWINGS

The above and other objects, advantages and features of the present invention will be more apparent from description of certain preferred embodiments taken in conjunction with the accompanying, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
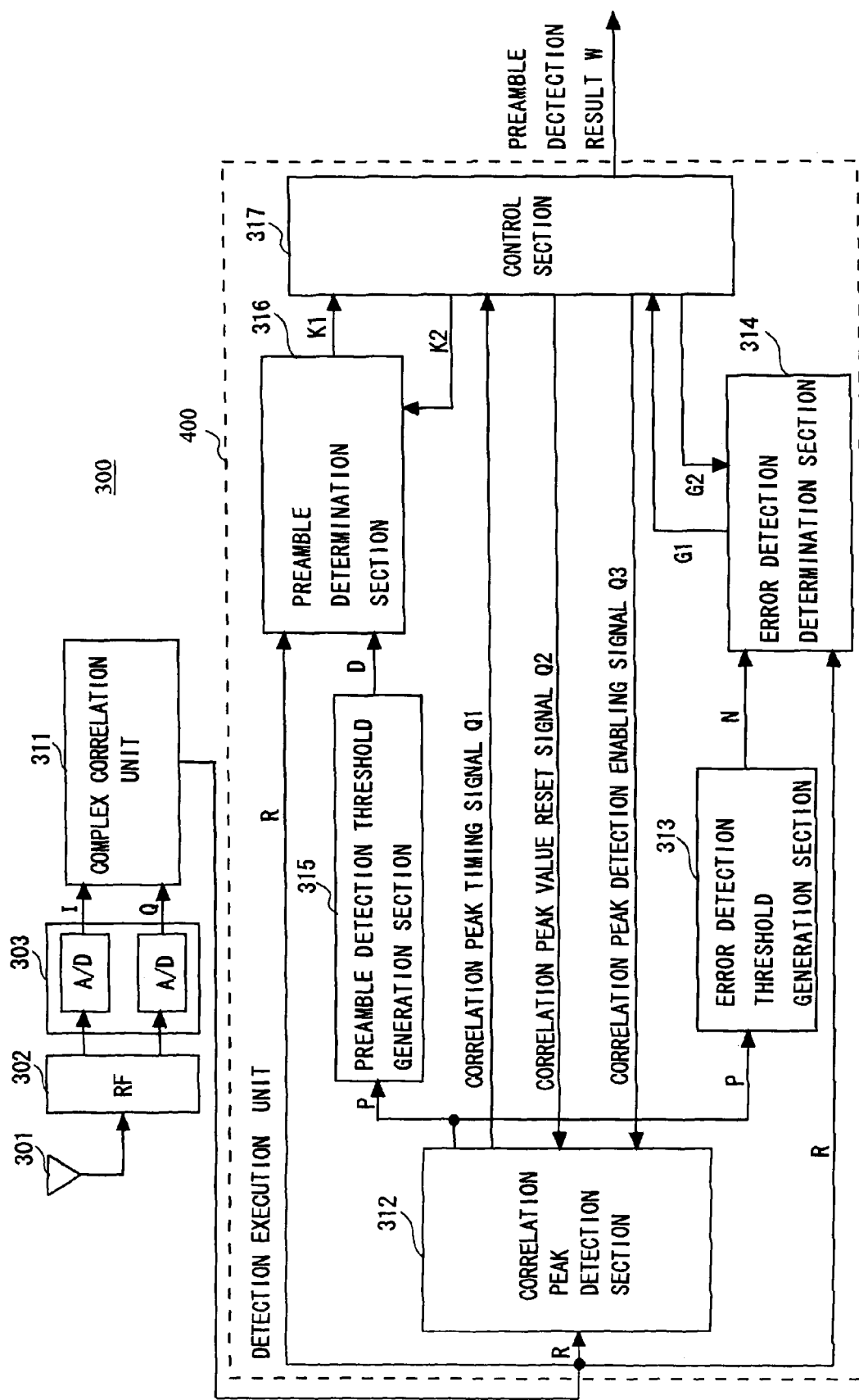
FIG. 1 is a block diagram showing the configuration of a preamble detection apparatus according to one embodiment of the present invention.

Referring now to FIG. 1, a preamble detection apparatus 300 according to a first embodiment of the present invention includes an antenna 301, an RF (Radio Frequency) unit 302, an A/D conversion unit 303, a complex correlation unit 311, and a detection execution unit 400. The antenna 301 receives a signal in the radio frequency band and outputs it to the RF unit 302. The RF unit 302 converts the signal in the radio frequency band into complex baseband signals (I and Q in FIG. 1). The A/D conversion unit 303 includes an A/D converters so that it converts the complex baseband signals into a digital signal. The complex correlation unit 311 stores a fixed pattern of a preamble signal so that it determines the correlation between the digital signal from the A/D conversion unit 303 and outputs a correlation result R to the detection execution unit 400.

The detection execution unit 400 includes a correlation peak detection section 312, a preamble detection threshold generation section 315, a preamble determination section 316, an error detection threshold generation section 313, an error detection determination section 314, and a control section 317 for controlling these sections and obtaining a preamble detection result W.

The control section 317 functions as a symbol timing detection controller and a preamble detection controller. The error detection threshold generation section 313, the error detection determination section 314 and a part of the control section 317 form a symbol timing determination part. The preamble detection threshold generation section 315 and the preamble determination section 316 form a periodicity confirmation part.

The control section 317 is described in detail hereinafter. The control section 317 supplies a correlation peak detection enabling signal Q3 and a correlation peak value reset signal Q2 to the correlation peak detection section 312, and supplies an error detection determination enabling signal G2 to the error detection determination section 314, and a preamble determination enabling signal K2 to the preamble determination section 316. In the following description, a signal being "active" means being "1", and a signal being "inactive" means being "0".

Figure 2:
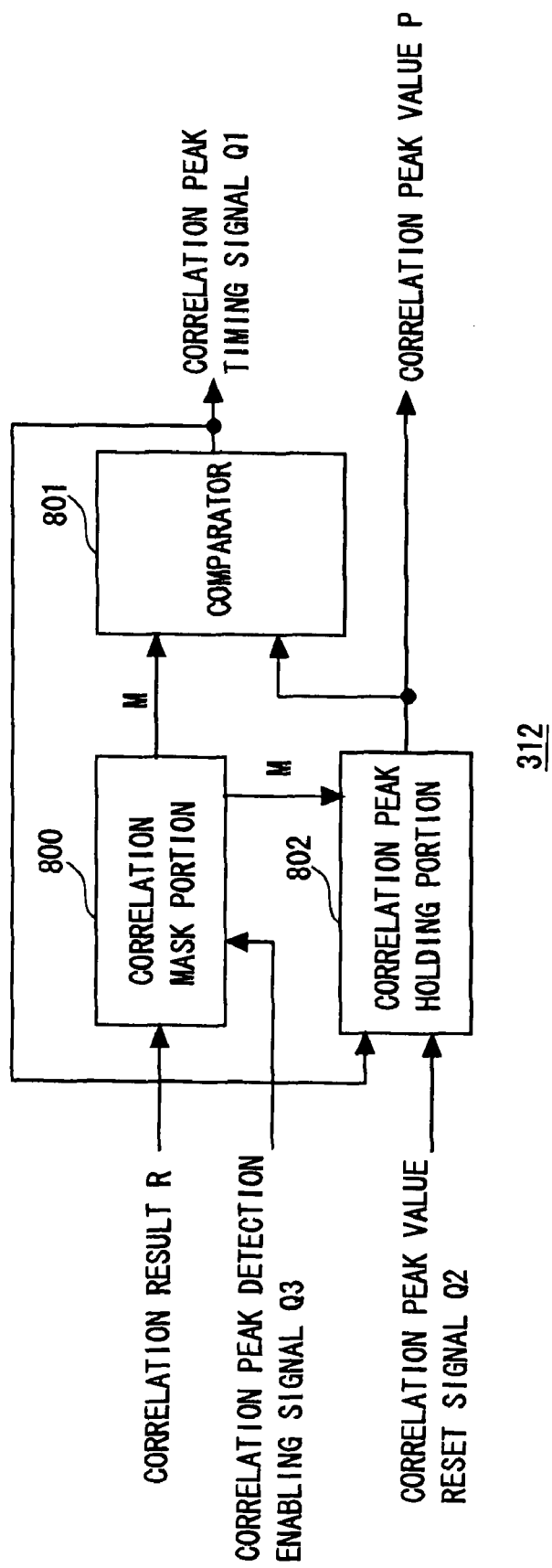
FIG. 2 is a block diagram showing the configuration of a correlation peak detection section in the preamble detection apparatus of FIG. 1.

During the period (which is referred to hereinafter as the correlation peak detection period) where the correlation peak detection enabling signal Q3 from the control section 317 is active, the correlation peak detection section 312 updates a maximum value of the correlation result R supplied from the complex correlation unit 311 and holds it (which is referred to hereinafter as correlation peak detection processing), and holds its value and timing. Thus, the correlation peak detection section 312 holds a maximum value from the start of the correlation peak detection processing (or from the time of reset if a value is reset after the start) up to the present. The maximum value is referred to hereinafter as a correlation peak value P. FIG. 2 shows the configuration of the correlation peak detection section 312.

Referring to FIG. 2, the correlation peak detection section 312 includes a correlation mask portion 800, a correlation peak holding portion 802, and a comparator 801.

The correlation mask portion 800 performs mask processing which outputs "0" for the correlation result R which is input during the interval where the correlation peak detection enabling signal Q3 is inactive, while it does not perform the mask processing and outputs the correlation result R without any change during the correlation peak detection period. A correlation mask portion output M which is obtained by the correlation mask portion 800 is input to the correlation peak holding portion 802 and the comparator 801.

The correlation peak holding portion 802 holds a correlation peak value P (initial value=0). The comparator 801 compares the correlation mask portion output M with the correlation peak value P which is held in the correlation peak holding portion 802. If the correlation mask portion output M is larger than the correlation peak value P, the comparator 801 sets a correlation peak timing signal Q1 to "1" indicating the timing of detection of a new correlation peak. On the other hand, if the correlation mask portion output M is equal to or smaller than the correlation peak value P, the comparator 801 sets the correlation peak timing signal Q1 to "0" indicating no detection of a new correlation peak. The correlation peak timing signal Q1 is input to the correlation peak holding portion 802 and the control section 317.

The correlation peak holding portion 802 updates and holds the correlation peak value P. Specifically, if there is the correlation mask portion output M which is larger than the held correlation peak value P, the correlation peak holding portion 802 updates the correlation peak value P to the relevant correlation mask portion output M. Upon update, the correlation peak holding portion 802 outputs the updated correlation peak value P to the preamble detection threshold generation section 315 and the error detection threshold generation section 313. Further, when the correlation peak value reset signal Q2 from the control section 317 becomes active, the correlation peak holding portion 802 resets the correlation peak value P to the initial value "0".

The related art determines the timing of a maximum value which is the greatest in the preceding correlation result and when there is no correlation result which exceeds the maximum value in the symbol timing determination period with a predetermined length from that point as a symbol timing. The length of the symbol timing determination period is shorter than a symbol length and it is set according to the specification or the like.

Figure 3:
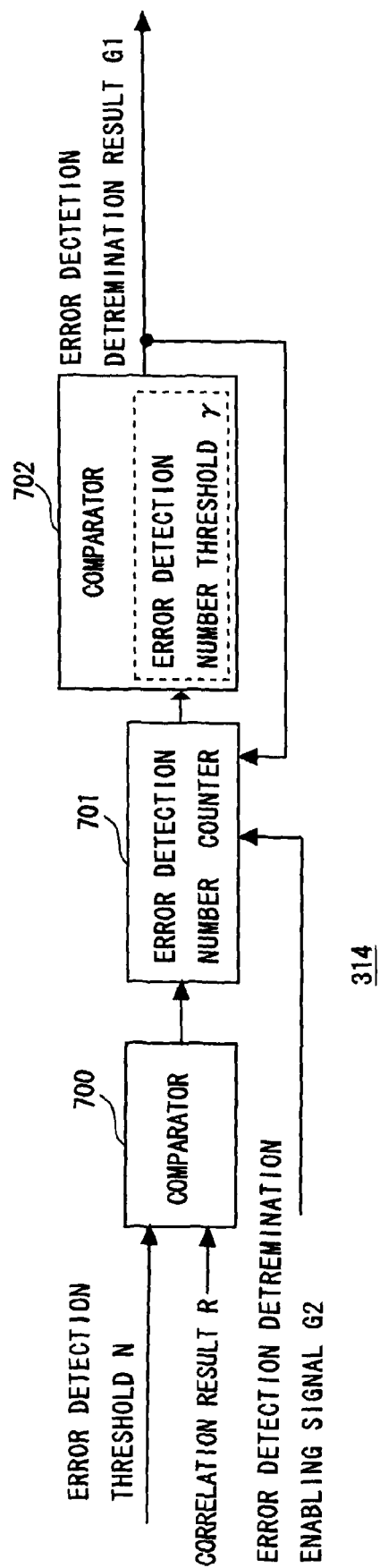
FIG. 3 is a block diagram showing the configuration of an error detection determination section 314 in the preamble detection apparatus of FIG. 1.

On the other hand, this embodiment confirms that the timing of a maximum value is a true symbol timing, in addition to determining a symbol timing based on the condition that there is no greater correlation result than the maximum value in the symbol timing determination period on the basis of the maximum value. The error detection determination section 314 performs the confirmation process. FIG. 3 shows the configuration of the error detection determination section 314.

The error detection determination section 314 includes a comparator 700, an error detection number counter 701, and a comparator 702.

The comparator 700 compares the correlation result R which is supplied from the complex correlation unit 311 and an error detection threshold N (which is described in detail later) which is supplied from the error detection threshold generation section 313. If the correlation result R is larger than the error detection threshold N, the comparator 700 outputs "1" indicating such a state. If, on the other hand, the correlation result R is equal to or smaller than the error detection threshold N, the comparator 700 outputs "0" indicating such a state.

The error detection number counter 701 counts the number of times when the output of the comparator 700 becomes "1" during the period when the error detection determination enabling signal G2 from the control section 317 is active or "1" (i.e. the error detection determination period which is defined in the symbol timing determination period) and outputs the result to the comparator 702. The error detection number counter 701 is initialized by the error detection determination enabling signal G2 indicating "0" so that the count value returns to its initial value "0".

The comparator 702 compares the output of the error detection number counter 701 with a preset error detection number threshold γ to obtain an error detection determination result G1 and outputs it. Specifically, the comparator 702 outputs "1" indicating occurrence of error detection when the output of the error detection number counter 701 is larger than the error detection number threshold γ, while otherwise it outputs "0" indicating no occurrence of error detection.

The error detection number threshold γ is a threshold such that when the number of times when the correlation result R which is larger than the error detection threshold N is detected during the error detection determination period exceeds the error detection number threshold γ, the correlation peak value which is currently held in the correlation peak detection section 312 is not a correlation result at a true symbol timing, which indicates error detection. The error detection number threshold γ is preferably larger than 1, and it is a minimum value which is predetermined by system simulation so as to have no or negligible effect even if not determined as error detection. The error detection number threshold γ is set to "3" in this example. The error detection determination result G1 which is obtained by the comparator 702 is input to the control section 317.

The error detection threshold N which is used by the error detection determination section 314 is supplied from the error detection threshold generation section 313. In this embodiment, the error detection threshold generation section 313 generates the error detection threshold N according to the correlation peak value P which is output from the correlation peak detection section 312. Specifically, it generates the error detection threshold N by multiplying the correlation peak value P by a coefficient α (0<α<1). The value of α is a minimum value that is predetermined by system simulation so that there is no omission of detection of a preamble to be detected or, if any, its effect is negligible in the error determination of the error detection. It is set to 0.5 in this example.

The control section 317 determines the timing of the correlation peak value P which is held in the correlation peak detection section 312 as a symbol timing on condition that the correlation peak value P which is held in the correlation peak detection section 312 is not updated, that is, the correlation peak timing signal Q1 from the correlation peak detection section 312 does not become active in the symbol timing determination period, and that the error detection determination result G1 from the error detection determination section 314 does not become active in the error detection determination period, thereby determining the symbol timing.

Figure 5:
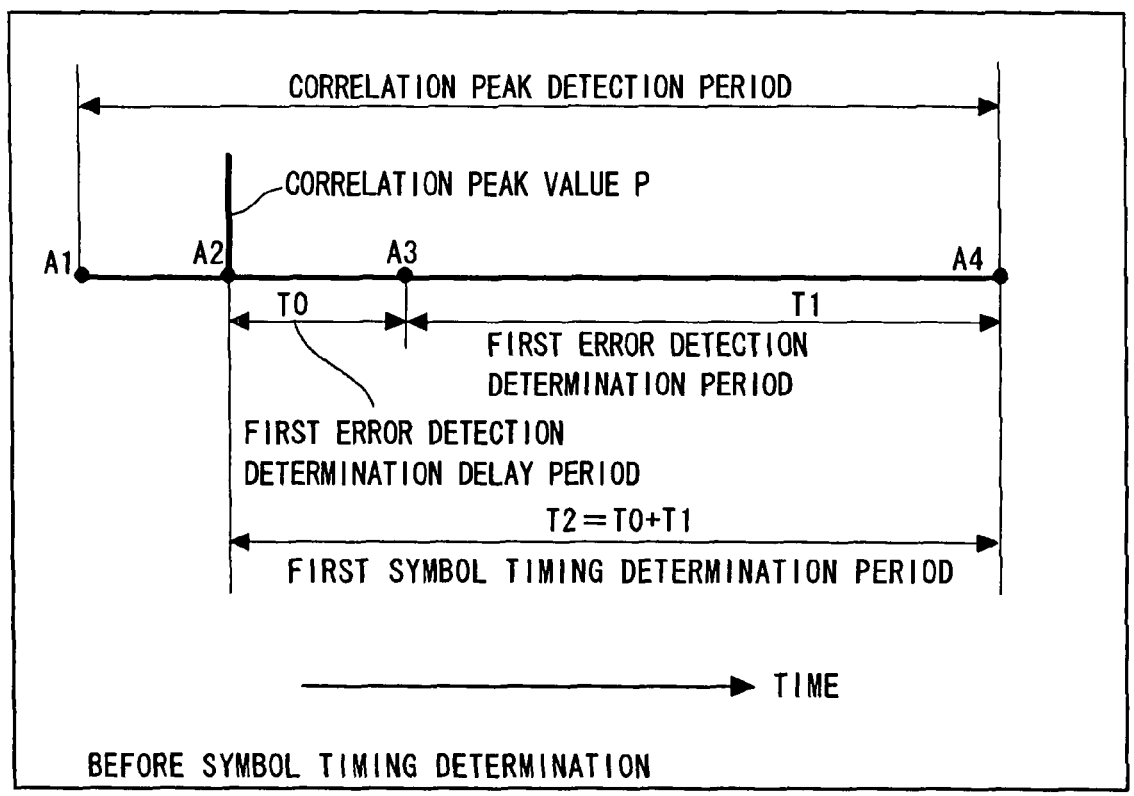
FIG. 5 is a first view to describe each period regarding the present invention.

FIG. 5 shows the peak detection period, the symbol timing determination period and the error detection determination period until a symbol timing is determined, and the relationship of those.

The point A1 in FIG. 5 indicates the start point of the correlation peak detection processing by the correlation peak detection section 312 or the reset point. Assume that a maximum value of a correlation result during the period from A1 to A2 appears at A2, and the value is held as a correlation peak value P by the correlation peak detection section 312. The period to determine whether the timing of the correlation peak value P is a symbol timing or not, which is the symbol timing determination period T2, is the period from A2 to A4. This period is preset, beginning at the correlation peak value P. If the timing of the correlation peak value P is a symbol timing, a timing which is at 1 symbol distance from that timing is a next symbol timing, and there should be no larger correlation value than the correlation peak value P between the two adjacent symbol timings. Accordingly, the symbol timing determination period T2 is set from the timing of the correlation peak value P to the point immediately before the next symbol timing, which is, for example, from the correlation peak value P to the point which is 1 clock or several clocks before the timing at 1 symbol length distance from the correlation peak value P. Then, it is detected whether there is a correlation result which is larger than the correlation peak value P within the symbol timing determination period T2.

The error detection determination period T1 is an interval that is set within the symbol timing determination period T2. In this embodiment, it begins at the point A3 which is at T0 distance from the correlation peak value P and ends at the point A4, which is the same as the end point of the symbol timing determination period T2. The purpose of setting this interval and the detail of the processing which is performed during this interval are described later.

In this embodiment, when determining whether the timing A2 of the correlation peak value P shown in FIG. 5 is a symbol timing or not, the control section 317 determines the timing A2 as a symbol timing on condition that the correlation peak value P is not updated during the symbol timing determination period T2 which is set on the basis of the point A2, and that the error detection determination result G1 does not become active during the error detection determination period T1.

Further, when the correlation peak timing signal Q1 from the correlation peak detection section 312 becomes active and the correlation peak value P is updated at any point during the symbol timing determination period T2, the control section 317 makes control to determine whether the timing of the updated correlation peak value P is a symbol timing or not. Specifically, the control section 317 sets new symbol timing determination period T2 and error detection determination period T1 on the basis of the timing of the updated correlation peak value P, and determines whether or not the updated correlation peak value P is further updated during the new symbol timing determination period T2 and whether the number of occurrences of the correlation result which is larger than a new error detection threshold N that is obtained from the updated correlation peak value P during the new error detection determination period T1 exceeds the error detection number threshold γ.

Furthermore, when the error detection determination result G1 becomes active at any point during the error detection determination period T1, the control section 317 makes control so as to reset the maximum value which is held by the correlation peak detection section 312 and perform correlation peak detection processing from the reset point and then determine whether or not the timing of the correlation peak value P which is newly detected by the correlation peak detection processing is a symbol timing or not.

Because the correlation result at a symbol timing is a significantly larger level than the correlation results at other timings different from the symbol timing, if the timing of the correlation peak value P which is held by the correlation peak detection section 312 is a symbol timing, the number of occurrences of the correlation result which exceeds the error detection threshold N that is obtained according to the maximum value should be small in the error detection determination period T1 which is set on the basis of such a correlation peak value P. On the contrary, the correlation result at a timing different from a symbol timing, such as the correlation peak value P of a correlation result which is detected from a non-preamble signal, is not large enough with respect to correlation results at other timings. Therefore, the number of occurrences of the correlation result which exceeds the error detection threshold N that is obtained according to the maximum value should be large in the error detection determination period T1 which is set on the basis of such a correlation peak value P.

Using the above assumption, the preamble detection apparatus 300 of this embodiment determines whether the timing of the correlation peak value P which is held by the correlation peak detection section 312 is a symbol timing or not on the condition that the number of occurrences of the correlation result which exceeds the error detection threshold N that is obtained by multiplying the correlation peak value P by the coefficient α is equal to or lower than the error detection number threshold γ during the error detection determination period T1 that is set within the symbol timing determination period T2, in addition to the condition that there is no correlation result which exceeds the correlation peak value P during the symbol timing determination period T2 that is set on the basis of the correlation peak value P. This reduces the probability of occurrence of error detection of a symbol timing, thereby more accurately detecting a symbol timing.

Further, because the preamble detection apparatus 300 of this embodiment performs the determination on the occurrence of error detection during the error detection determination period T1 which is set within the symbol timing determination period T2, the detection is persistent even when the number of symbols available for symbol timing synchronization is small.

Furthermore, the error detection determination section 314 uses the error detection number threshold γ which is larger than 1, and does not determine that it is error detection unless the number of occurrences of the correlation result which exceeds the error detection threshold N is larger than the error detection number threshold γ. This reduces the probability of occurrence of erroneous determination on error detection which is caused by a large correlation result due to a delayed wave in multipath or the like or a large correlation result that accidentally occurs due to thermal noise.

The error detection determination period T1 may be the same interval as the symbol timing determination period T2. In this embodiment, the start point A3 of the error detection determination period T1 is located in the position at T0 distance from the start point A1 of the symbol timing determination period T2 as shown in FIG. 5. A delayed wave of a relatively large level can occur due to multipath or the like in the vicinity of a symbol timing. It is possible to exclude the delayed wave from the error detection determination period T1 by setting the start point of the error detection determination period T1 in the position that is delayed behind the timing of the correlation peak value P as a determination target by a certain period (T0 in FIG. 5). This prevents that the determination on error detection is carried out for a large correlation result which is caused by a delayed wave, thereby avoiding the deterioration of a receiving sensitivity.

The period T0 is referred to hereinafter as an error detection determination delay period. In order to prevent wrong determination on error detection due to the presence of a relatively large level of a delayed wave, the length of the period T0 is set according to a transmission method and a receiving environment so as to include as long period where a delay wave can occur as possible and to be as short as possible for the prevention of omission of determination on error detection. For example, in MB-OFDM, the error detection determination delay period T0 may be 37 cycles (37/528 MHz) if one cycle is 1/528 MHz.

The length of the error detection determination period T1 is the interval that the error detection determination delay period T0 is excluded from the symbol timing determination period T2, and it is set according to a transmission method and a receiving environment. For example, in MB-OFDM, the error detection determination period T1 may be 123 cycles (123/528 MHz) if one cycle is 1/528 MHz.

The symbol timing determination period T2 is the sum of the error detection determination delay period T0 and the error detection determination period T1.

Each period until a symbol timing is determined is described above. In this embodiment, the determination whether a determined symbol timing is a true symbol timing or not is continued after a symbol timing is determined. In order to distinguish from each period after the determination of a symbol timing, the error detection determination delay period T0, the error detection determination period T1 and the symbol timing determination period T2 prior to the determination of a symbol timing are referred to hereinafter as a first error detection determination delay period, a first error detection determination period and a first symbol timing determination period, respectively. The processing by the error detection threshold generation section 313, the error detection determination section 314 and a part of the control section 317 which is performed until a symbol timing is determined is referred to hereinafter as a symbol timing determination processing.

The processing in the symbol timing determination part of the detection execution unit 400, which is the error detection threshold generation section 313, the error detection determination section 314 and a part of the control section 317, is described in the foregoing. Upon determination of a symbol timing, the control section 317 activates the preamble determination enabling signal K2 to be transmitted to the preamble determination section 316. This starts the detection of a preamble by the preamble detection threshold generation section 315, the preamble determination section 316 and a part of the control section 317.

The preamble determination enabling signal K2 from the control section 317 causes the preamble determination section 316 to confirm the periodicity of a symbol position. It is activated in a periodicity confirmation window which is opened according to a symbol length on the basis of the symbol timing that is obtained by the symbol timing determination part. Because symbols are allocated periodically, the position where a distance from a symbol timing is a multiple of a symbol length should be a symbol position in a preamble, and a correlation result in such a position should have a large level. The position of a periodicity confirmation window is set to include such positions. The periodicity confirmation window is also referred hereinafter as a preamble determination period.

Figure 4:
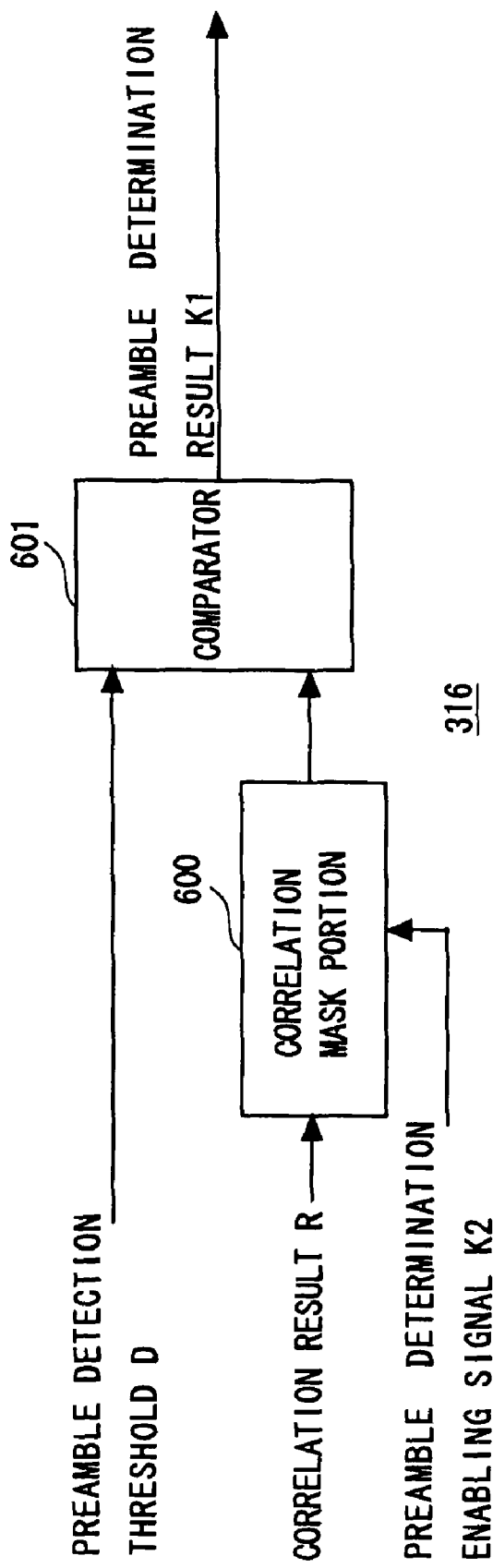
FIG. 4 is a block diagram showing the configuration of a preamble determination section 316 in the preamble detection apparatus of FIG. 1.

The preamble determination section 316 compares the correlation result R with a preamble detection threshold D (which is described in detail later) that is supplied from the preamble detection threshold generation section 315 during the interval where the preamble determination enabling signal K2 from the control section 317 is active (which is the preamble determination period). Based on the comparison result, the preamble determination section 316 outputs a preamble determination result K1 indicating whether the periodicity is confirmed or not. Referring to FIG. 4, the preamble determination section 316 includes a correlation mask portion 600 and a comparator 601.

The correlation mask portion 600 performs mask processing which outputs "0" for the correlation result R which is input during the interval where the preamble determination enabling signal K2 is inactive, while it does not perform the mask processing and outputs the correlation result R without any change during the preamble determination period.

The comparator 601 compares the output of the correlation mask portion 600 with the preamble detection threshold D and outputs the preamble determination result K1. Specifically, if the output of the correlation mask portion 600 is larger than the preamble detection threshold D, the comparator 601 outputs "1" indicating that the preamble determination or periodicity confirmation is a success. If not, the comparator 601 outputs "0" indicating that the preamble determination or periodicity confirmation is a failure.

The preamble detection threshold D which is used by the preamble determination section 316 is supplied from the preamble detection threshold generation section 315. The preamble detection threshold generation section 315 generates the preamble detection threshold D according to the correlation peak value P which is output from the correlation peak detection section 312. Specifically, it generates the preamble detection threshold D by multiplying the correlation peak value P by a coefficient β (0<β<1). The value of β is a minimum value that is predetermined by system simulation so that there is no omission of detection of a preamble to be detected or, if any, its effect is negligible, and it is set to 0.2 in this example.

Based on the determination result in the preamble determination section 316, the control section 317 obtains a preamble detection result W indicating whether a preamble is detected or not. Specifically, when the determination on a preamble by the preamble determination section 316 results in success for a predetermined number of times in succession, the control section 317 outputs "1" as the preamble detection result W to indicate that a preamble is detected. The "predetermined number of times" is one or more and preferably two or more. In this embodiment, it is two, considering the balancing of speed and accuracy in detection.

Figure 6:
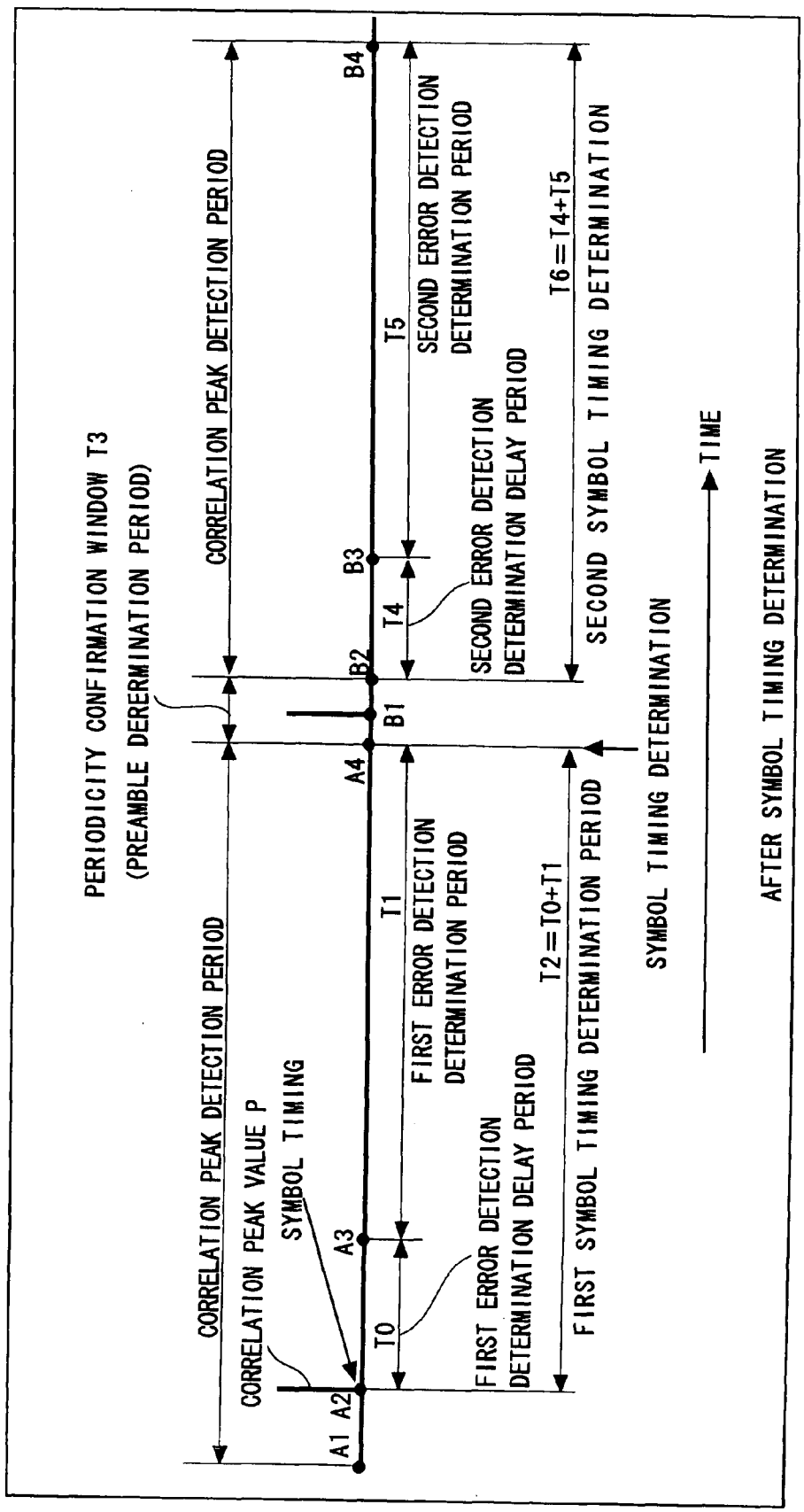
FIG. 6 is a second view to describe each period regarding the present invention.

As described earlier, the control section 317 of this embodiment makes control so as to continue the determination whether a determined symbol timing is a true symbol timing or not after the symbol timing is determined. FIG. 6 shows the periods after a symbol timing is determined and the relationship of those period.

In FIG. 6, the timing A2 of the correlation peak value P is determined as a symbol timing. This is determined at the timing of the end point A4 of the first symbol timing determination period T2.

Upon determination of a symbol timing, the control section 317 activates the preamble determination enabling signal K2 to cause the preamble determination section 316 to confirm a periodicity. The confirmation of a periodicity is performed in the periodicity confirmation window. In FIG. 6, the period from A4 to B2 is the periodicity confirmation window or the preamble determination period T3. If the timing A2 of the correlation peak value P is a true symbol timing, there should be a correlation result which exceeds the preamble detection threshold D at the timing B1 in FIG. 6, so that the periodicity confirmation succeeds. In this embodiment, the condition for preamble detection is such that the periodicity confirmation succeeds two times in succession. Therefore, if the periodicity confirmation succeeds in the first preamble determination period, the control section 317 sets a second preamble determination period (after the point B4, which is not shown in FIG. 6) and causes the preamble determination section 316 to carry out the second-time confirmation. On the other hand, if the periodicity confirmation fails in the first preamble determination period, of if the periodicity confirmation succeeds in the first preamble determination period but fails in the second preamble determination period, the control section 317 determines that a preamble is not detected and controls the correlation peak detection section 312 to reset the correlation peak value P and reattempt the correlation peak detection processing and the symbol timing determination processing from the point of reset.

The length of the preamble determination period T3 is determined according to a communication method and a receiving environment. For example, in MB-OFDM, the preamble determination period T3 may be 10 cycles (10/528 MHz) if one cycle is 1/528 MHz.

Further, after a symbol timing is determined, the control section 317 sets the interval excluding the preamble determination period T3 as a correlation peak detection period so that the correlation peak detection processing continues during the interval as shown in FIG. 6. Because the determination whether the symbol timing A2 is a true symbol timing or not is performed accordingly, the correlation peak detection period also serves as the symbol timing determination period T6. In order to distinguish from the first symbol timing determination period T2 prior to the determination of a symbol timing, the symbol timing determination period T6 is referred to hereinafter as a second symbol timing determination period.

The second symbol timing determination period T6 is also composed of an error detection determination period (a second error detection determination period T5) and an error detection determination delay period (a second error detection determination delay period T4).

The length of the second error detection determination delay period T4 is an optimum value that is selected according to a transmission method and a receiving environment. For example, in MB-OFDM, the second error detection determination delay period T4 may be 32 cycles (32/528 MHz) if one cycle is 1/528 MHz.

The length of the second error detection determination period T5 is also determined according to a transmission method and a receiving environment. For example, in MB-OFDM, the second error detection determination period T5 may be 123 cycles (123/528 MHz) if one cycle is 1/528 MHz.

During the second symbol timing determination period T6, it is determined whether the timing A2 is a true symbol timing or not. The determination processing and the processing after it is determined that the timing A2 is not a true symbol timing are the same as those performed before a symbol timing is determined and thus not described in detail herein.

If the preamble determination succeeds in the preamble determination period T3, and the update of the correlation peak value P and the determination of error detection do not occur in the second symbol timing determination period T6 from the timing B2 to B4, the control section 317 sets a second preamble determination period on the basis of the symbol timing A2 after the timing B4 so as to perform the second preamble determination and controls the preamble determination section 316 to perform the periodicity confirmation again. If the periodicity confirmation succeeds in the second preamble determination period also, the control section 317 outputs "1" as the preamble detection result W to indicate that a preamble is detected.

As described above, after a symbol timing is determined, this embodiment performs the determination whether the determined symbol timing is a true timing is not, thereby effectively preventing error detection of a symbol timing and error detection of a preamble.

The processing in the detection execution unit 400 is described hereinafter in further detail with reference to FIGS. 7 to 9.

Figure 7:
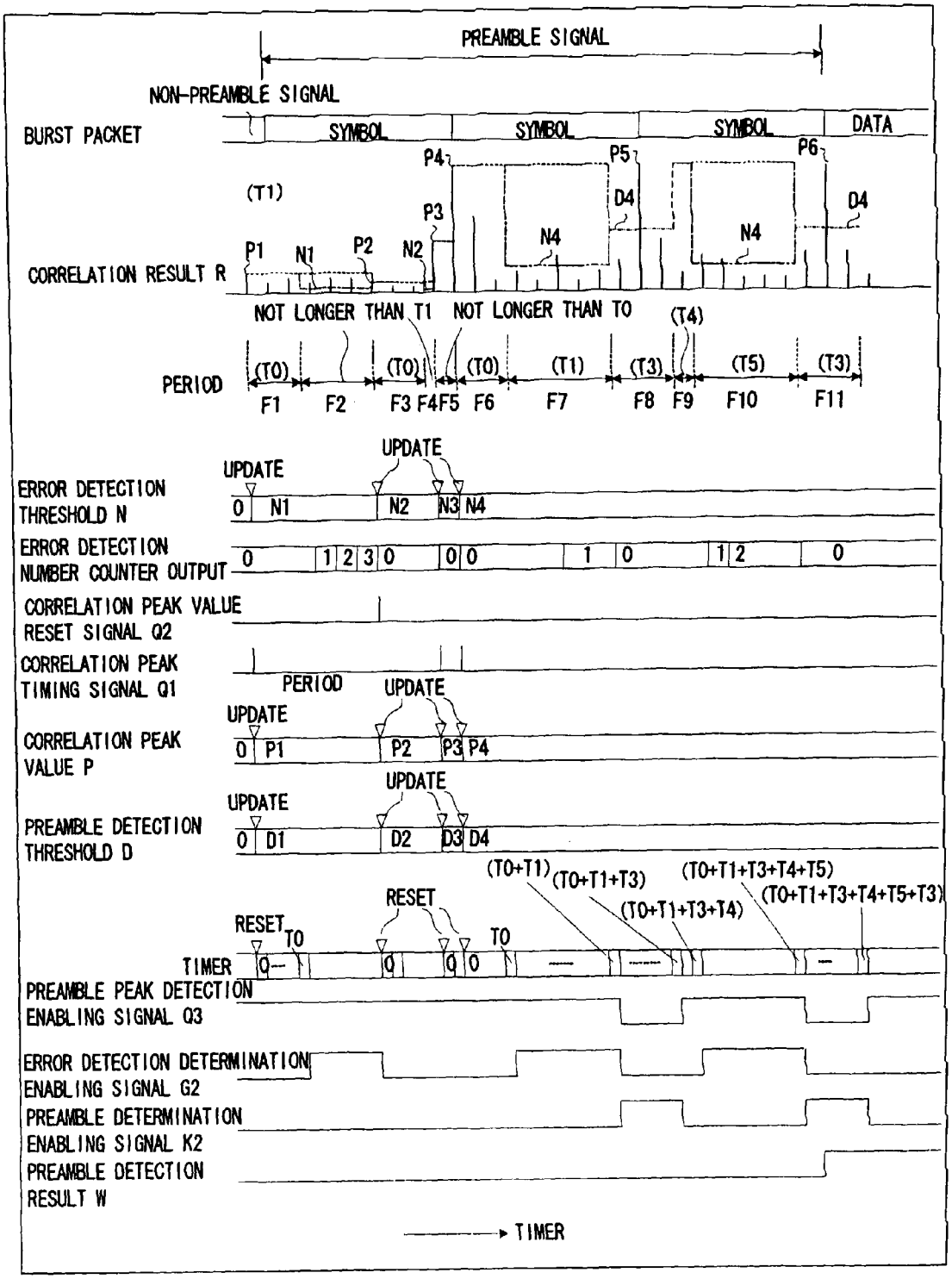
FIG. 7 is an example of a timing chart of processing in a detection execution unit in the preamble detection apparatus of FIG. 1.

FIG. 7 shows a timing chart of the processing which is performed by the detection execution unit 400 for a burst packet that is illustrated at the top of FIG. 7. FIGS. 8 and 9 show flowcharts of the control section 317. The burst packet that is illustrated at the top of FIG. 7 is a complex baseband signal which is digitalized by the RF unit 302 and the A/D conversion unit 303. The correlation result R is a correlation result which is determined for the complex baseband signal by the complex correlation unit 311.

Figure 8A:
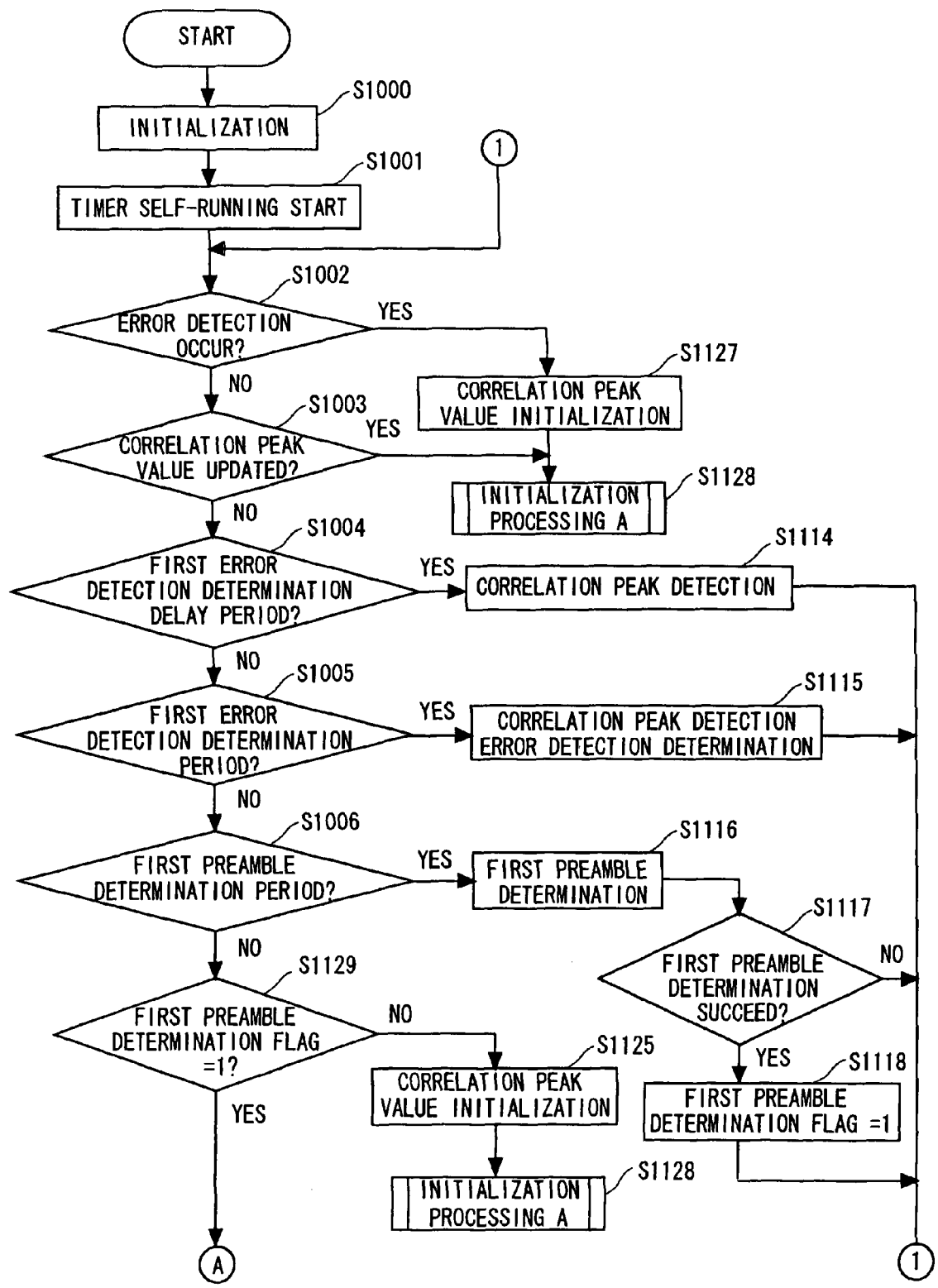
FIG. 8A and FIG. 8B are flowcharts showing the process flow in the preamble detection apparatus of FIG. 1.
Figure 8B:
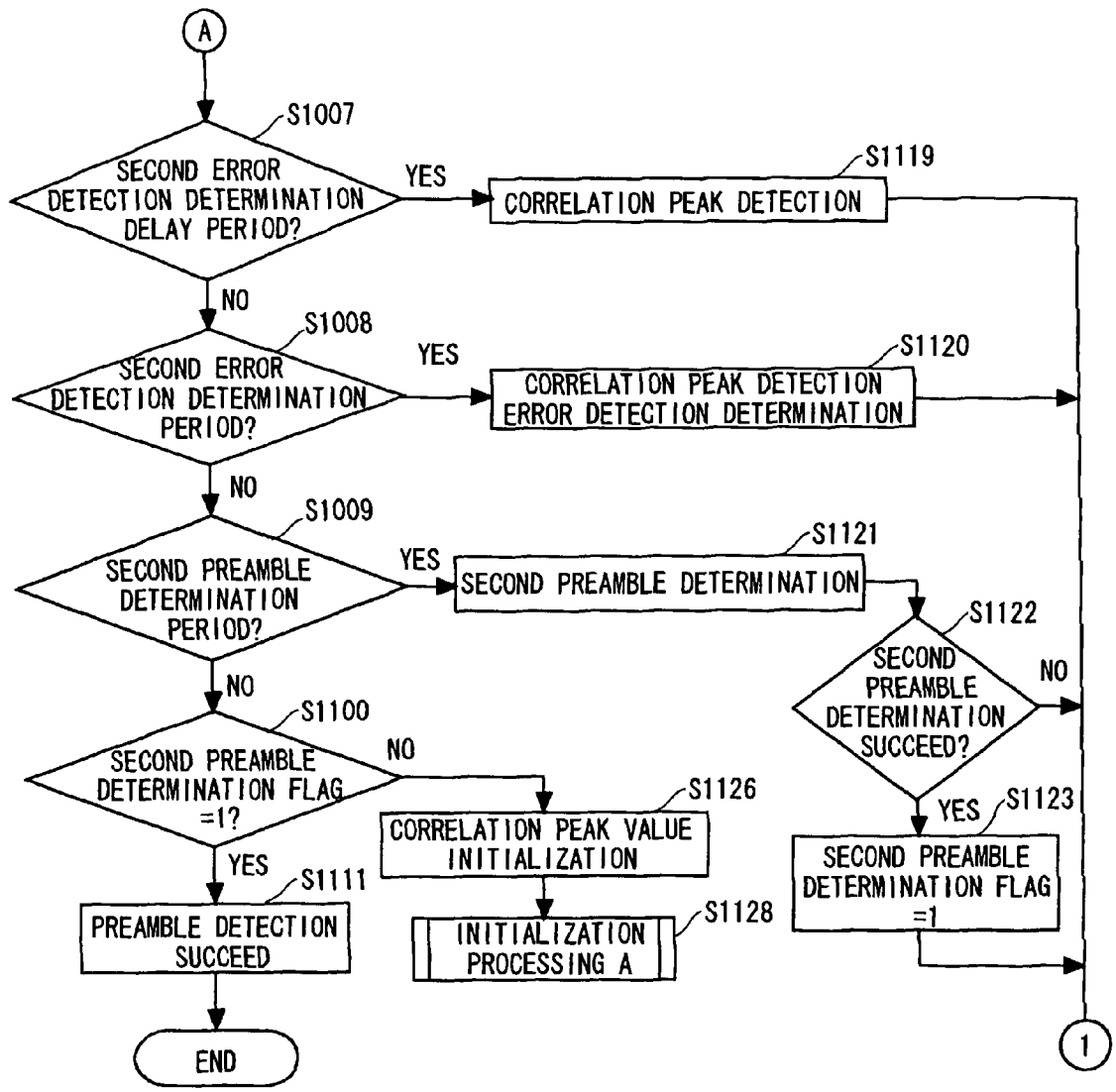
Figure 9:
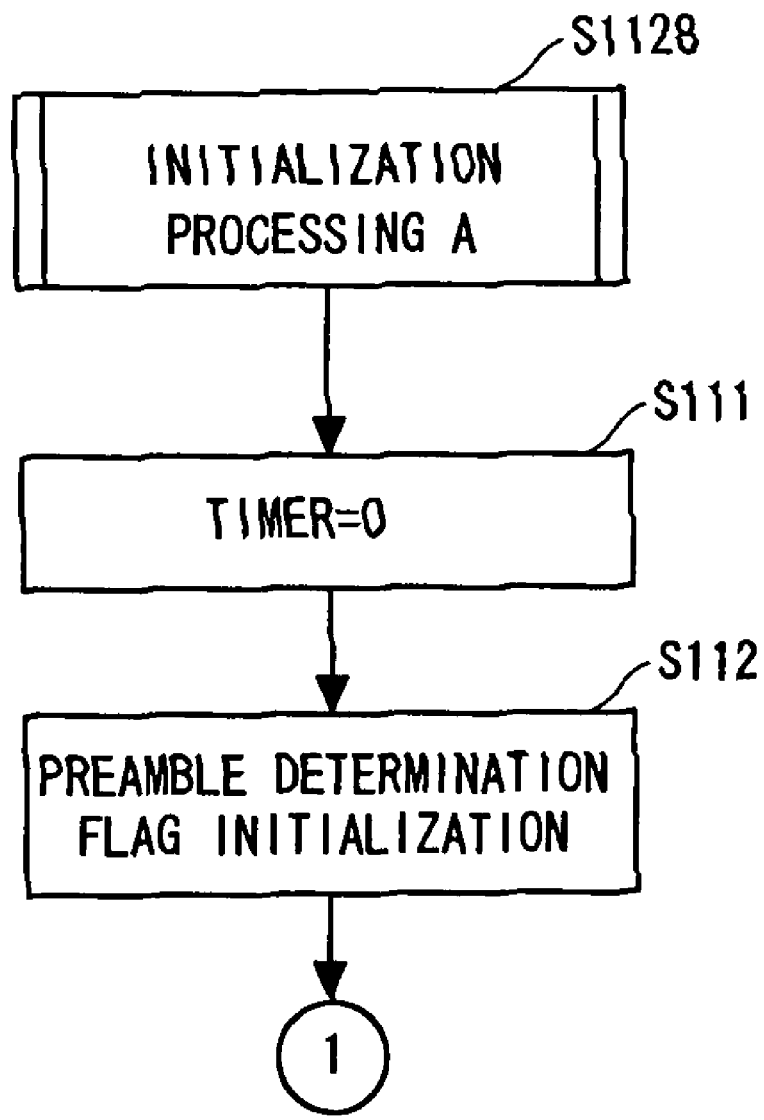
FIG. 9 is another flowchart showing the process flow in the preamble detection apparatus of FIG. 1.

The processing which is shown in the flowcharts of FIGS. 8 and 9 is described hereinafter with reference to the example of FIG. 7.

Referring to FIG. 8A and FIG. 8B, the detection execution unit 400 initializes each functional block at the start of preamble detection (S1000).

Specifically, the control section 317 initializes the correlation peak value reset signal Q2, the error detection determination enabling signal G2, the preamble determination enabling signal K2, the preamble detection result W, and two preamble determination flags, which are described later, to "0", and also initializes an internal timer, which is not shown, to "0". The control section 317 has two preamble determination flags which indicate the result of periodicity confirmation by the preamble determination section 316. The two preamble determination flags respectively correspond to two times of periodicity confirmation which is performed by the preamble determination section 316 and they are activated when the preamble determination result K1 is active.

The correlation peak detection section 312 initializes the correlation peak value P and the correlation peak timing signal Q1 to "0".

The error detection determination section 314 initializes the count value of the error detection number counter 701 and the error detection determination result G1 to "0".

The error detection threshold generation section 313 and the preamble detection threshold generation section 315 set the error detection threshold N and the preamble detection threshold D to "0", respectively.

The control section 317 activates the correlation peak detection enabling signal Q3 to start the correlation peak detection processing by the correlation peak detection section 312, and a timer, which is not shown, of the control section 317 starts self-running (S1001).

After that, upon output of the current correlation result R from the complex correlation unit 311, the control section 317 checks the state of the error detection determination result G1 that is based on the previous correlation result R (S1002). If the result is "1" indicating the occurrence of error detection (YES in S1002), the control section 317 sets the correlation peak value reset signal Q2 to "1" so that the correlation peak detection section 312 initializes the correlation peak value P (S1127) and also performs initialization processing A (S1128). Referring to FIG. 9, the initialization processing A in Step S1128 includes timer initialization (S111) to set a timer to "0" and flag initialization (S112) to set two preamble determination flags to "0". As shown in FIG. 9, after the initialization processing A, the control section 317 returns the process to Step S1002 to repeat the processing from the point of reset.

On the other hand, if the checking result in Step S1002 is "0" indicating no occurrence of error detection (NO in S1002), the control section 317 moves the process to Step S1003. Because the error detection determination result G1 is "0" immediately after the initialization, the process proceeds from Step S1002 to Step S1003.

In Step S1003, the control section 317 checks if the previous correlation result R is detected as the correlation peak value P. Specifically, if the correlation peak timing signal Q1 is active or "1", it is determined that the previous correlation result R is detected as the correlation peak value P, that is, the correlation peak value P is updated (YES in S1003). Thus, the process performs the initialization processing A (S1128) and repeats the processing from Step S1002, beginning at the updated correlation peak value P.

If the correlation peak timing signal Q1 is "0" in Step S1003, the process proceeds to Step S1004, determining that the previous correlation result R is not detected as the correlation peak value P (NO in S1003). Because the correlation peak timing signal Q1 is "0" immediately after the initialization, the process proceeds from Step S1003 to Step S1004.

In the example of FIG. 7, a maximum value P1 in the correlation results R up to the present is detected, the correlation peak value P is updated by the correlation peak detection section 312 at the timing of the detected maximum value P1, and P1 is held as a correlation peak value P. Accordingly, the correlation peak timing signal Q1 which is output from the correlation peak detection section 312 is set to "1". The error detection threshold N is thereby set to N1 which is the multiplication product of P1 by the coefficient α, and the preamble detection threshold D is set to D1 which is the multiplication product of P1 by the coefficient β. Further, the timer is reset to "0".

Then, the process performs from Step 1004 the determination whether the timing of P1 which is held as a correlation peak value P is a symbol timing or not.

As described earlier, the determination whether the timing of the correlation peak value P which is held in the correlation peak detection section 312 is a symbol timing or not prior to the determination of a symbol timing is performed during the first symbol timing determination period T2 shown in FIG. 5. The first symbol timing determination period T2 is composed of the first error detection determination delay period T0 and the first error detection determination period T1.

The control section 317 keeps the correlation peak detection enabling signal Q3 to be active if the timing of the current correlation result is within the first error detection determination delay period T0 (i.e. the timer indicates T0 or below) on the basis of the correlation peak value P which is currently held by the correlation peak detection section 312, thereby letting the correlation peak detection section 312 keep performing the correlation peak detection processing (YES in S1004, S1114). In this period, the control section 317 holds the error detection determination enabling signal G2 and the preamble determination enabling signal K2 to "0", thereby disabling the error detection determination and the preamble determination.

As a result of the processing in Step S1114, if the current correlation result is larger than the correlation peak value P which is currently held by the correlation peak detection section 312, the correlation peak value P is updated, and the correlation peak timing signal Q1 which is input to the control section 317 becomes active. If, on the other hand, the current correlation result is equal to or smaller than the correlation peak value P which is currently held, the correlation peak value P is not updated, and the correlation peak timing signal Q1 does not become active.

After the correlation peak detection processing in Step S1114, the process returns to Step S1002 to perform the determination based on the next correlation result.

In the example of FIG. 7, any correlation result in the first error detection determination delay period T0 (period F1 in FIG. 7) on the basis of P1 does not exceed P1. Thus, the error detection determination delay period T0 ends without updating the correlation peak value P, and the process proceeds to the processing in the error detection determination period T1 (S1114, NO in S1002, NO in S1003, and NO in S1004).

If a correlation result R exceeds the correlation peak value P which is currently held by the correlation peak detection section 312 and the correlation peak value P is updated at any point during the first error detection determination delay period T0, the control section 317 performs the initialization processing A and controls the process to repeat the processing from Step S1002, beginning at the updated correlation peak value P (NO in S1002, YES in S1003, S1128).

In the first error detection determination period T1, the control section 317 allows the correlation peak detection section 312 to keep performing the correlation peak detection and further controls the error detection determination section 314 to perform the error detection determination (YES in S1005, S1115).

If the current correlation result R is larger than the correlation peak value P being held, the correlation peak detection section 312 updates the correlation peak value P and activates the correlation peak timing signal Q1 to be output to the control section 317.

On the other hand, if the current correlation result R is equal to or smaller than the correlation peak value P being held, the correlation peak detection section 312 does not update the correlation peak value P, so that the correlation peak timing signal Q1 does not become active.

The error detection determination section 314 determines whether the current correlation result is larger than the error detection threshold N, and, if it is larger, increments the number of error detection by one and compares a total number with the error detection number threshold γ. As a result of the comparison, if the error detection number is larger than the error detection number threshold γ, the error detection determination section 314 activates the error detection determination result G1. If, on the other hand, the error detection number is smaller than the error detection number threshold γ, the error detection determination section 314 does not activate the error detection determination result G1.

After Step S1115, the process returns to Step S1002. If, as a result of the correlation peak detection processing in Step S1115, the correlation peak value P is updated in the timing of the previous correlation result R, the control section 317 performs the initialization processing A and controls the process to repeat the processing from Step S1002, beginning at the updated correlation peak value P (NO in S1002, YES in S1003, S1128). On the other hand, if the correlation peak value P is not updated in the timing of the previous correlation result R, the control section 317 allows the correlation peak detection section 312 to keep performing the correlation peak detection and controls the error detection determination section 314 to perform the error detection determination if it is still within the first error detection determination period T1 (the timer indicates T0 or above and (T0+T1) or below) (NO in S1002, YES in S1003, NO in S1004, YES in S1005, and S1115).

Further, as a result of the error detection determination processing in Step S1115, if error detection is determined at the timing of the previous correlation result R (YES in S1002), the control section 317 controls the correlation peak detection section 312 to initialize the correlation peak value P (S1127) and further performs the initialization processing A (S1128). After the initialization processing A, the process returns to Step S1002 to repeat the processing from the point of the reset.

On the other hand, as a result of the error detection determination processing in Step S1115, if error detection is not determined at the timing of the previous correlation result R (NO in S1002), the control section 317 allows the correlation peak detection section 312 to keep performing the correlation peak detection and controls the error detection determination section 314 to perform the error detection determination if it is still within the first error detection determination period T1 (the timer indicates T0 or above and (T0+T1) or below) (NO in S1002, YES in S1003, NO in S1004, YES in S1005, and S1115).

In the example of FIG. 7, the occurrence of error detection is determined at the timing of the correlation result immediately before the timing P2 of the correlation result R in the first error detection determination period T1 (F2 in FIG. 7) on the basis of P1. Accordingly, the error detection determination result G1 becomes active and the determination in Step S1002 becomes YES in the timing of P2. Therefore, the control section 317 activates the correlation peak value reset signal Q2 so that the value P1 which is held by the correlation peak detection section 312 is reset to the initial value "0". Further, the control section 317 performs the initialization processing A, and then the process returns to Step S1002 to repeat the processing from the point of the reset (S1128).

The correlation result P2 is then detected as a new correlation peak value P and held by the correlation peak detection section 312. The symbol timing determination processing is performed on the peak value P2. As a result, although the correlation peak value P is not updated in the first error detection determination delay period T0 (F3) on the basis of P2, a correlation result P3 which is larger than P2 exists in the first error detection determination period T1 as shown in the example of FIG. 7. Therefore, the correlation peak detection section 312 updates the correlation peak value P to P3. Accordingly, the determination whether P3 is a symbol timing or not is performed after that. Because the update of the correlation peak value P occurs in the middle of the first error detection determination period T1 on the basis of P2, the length of the period F4 where the error detection determination is actually performed on P2 is equal to or shorter than the length of the first error detection determination period T1.

Further, the correlation peak value P is further updated to the correlation result P4, which is larger than P3, in the middle of the first error detection determination delay period T0 on the basis of P3, as shown in FIG. 7. Thus, the determination whether P4 is a symbol timing or not is performed. Because the update of the correlation peak value P occurs in the first error detection determination delay period T0, the length of a period F5 which is from P3 to the point where P3 is updated to P4 is equal to or shorter than the length of the first error detection determination delay period T0.

The process proceeds after that, and the maximum value is not updated in the first error detection determination delay period T0 (F6) on the basis of P4 and the first error detection determination period T1 (F7), and also error detection is not determined in the first error detection determination period T1 (F7). Therefore, the timing of P4 is determined as a symbol timing at the end of the first symbol timing determination period T2 (F6+F7) on the basis of P4.

A symbol timing is thereby determined.

The processing after a symbol timing is determined starts from Step S1129 in FIG. 8A. The control section 317 sets a first periodicity confirmation window, which is the first preamble determination period T3, on the basis of the determined symbol timing, and controls the preamble determination section 316 to perform preamble determination (YES in S1006, S1116). Specifically, the correlation peak detection enabling signal Q3 is set to "0" so as to disable the correlation peak detection, the preamble determination enabling signal K2 is set to "1" so as to enable the preamble determination, and the error detection determination enabling signal G2 is set to "0" so as to disable the error detection determination, thereby performing the periodicity confirmation by the preamble determination section 316.

When the preamble determination enabling signal K2 becomes "1", the preamble determination section 316 clears the mask of the correlation mask portion 600 and compares the output of the correlation mask portion 600 with the preamble detection threshold D4 by the comparator 601. The comparator 601 compares the current correlation result R with the preamble detection threshold D which is obtained from the correlation result at the determined symbol timing (which is the correlation peak value P that is held by the correlation peak detection section 312). If there is the correlation result R which exceeds the preamble detection threshold D, the comparator 601 sets the preamble determination result K1 to "1" indicating success in preamble determination. If the preamble determination result K1 becomes "1" (YES in S1117), the control section 317 sets a first preamble determination flag to "1" indicating success in the first preamble determination (S1118).

On the other hand, if preamble determination does not succeed in the first preamble determination period T3 (NO in S1117), the control section 317 sets the correlation peak value reset signal Q2 to "1" so that the correlation peak detection section 312 initializes the correlation peak value P, and further performs initialization processing A (NO in S1002, NO in S1003, NO in S1004, NO in S1005, NO in S1006, NO in S1129, S1125 and S1128). Then, the process returns to Step S1002 to repeat the processing from the point of the reset.

In the example of FIG. 7, preamble determination succeeds on the correlation result P5 which exceeds the preamble detection threshold D4 in the first preamble determination period T3 (F8) on the basis of P4.

If the first preamble determination results in success (YES in S1129), the control section 317 sets the second symbol timing determination period T6 (the sum of the second error detection determination delay period T4 and the second error detection determination period T5) before the second preamble determination period T3 on the basis of the symbol timing, and makes control to confirm if the timing of P4 is a true symbol timing (S1007 to S1120). The confirmation is the same as the confirmation prior to the determination of a symbol timing and thus not described in detail herein.

In the example of FIG. 7, if there is no correlation result which is larger than P4 in the second error detection determination delay period T4 (F9 in FIG. 7) on the basis of P4 and further there is no correlation result which is larger than P4 in the second error detection determination period T5 (F10 in FIG. 7), error detection is not determined. Accordingly, the process proceeds to the second preamble determination (YES in S1009).

The second preamble determination is performed within the second preamble determination period T3 (F11 in the example of FIG. 7) on the basis of the symbol timing. Specific determination processing (S1121) and the processing in response to the determination result (S1122 to S1123, NO in S1100, S1126, S1128) are the same as those in the first preamble determination and thus not described in detail herein.

In the example of FIG. 7, the second preamble determination succeeds on the correlation result P6 in the second preamble determination period T3 (F11).

If the second preamble determination results in success (YES in S1110), the control section 317 outputs "1" as the preamble detection result W to indicate that a preamble is detected (S1111). The detection of a preamble thereby ends.

The preamble detection apparatus 300 of FIG. 1 according to the first embodiment of the present invention is described in the foregoing. The elements which are illustrated in FIG. 1 as functional blocks to implement various processing of the preamble detection apparatus 300 may be implemented as CPU, memory or other LSI in hardware configuration. It may be also configured as software which is implemented by a program that is loaded to a memory or the like. Accordingly, it is obvious to those skilled in the art that those functional blocks may be implemented in various forms such as hardware only, software only, and a combination of those and, it is not limited to any one of them.

Figure 10:
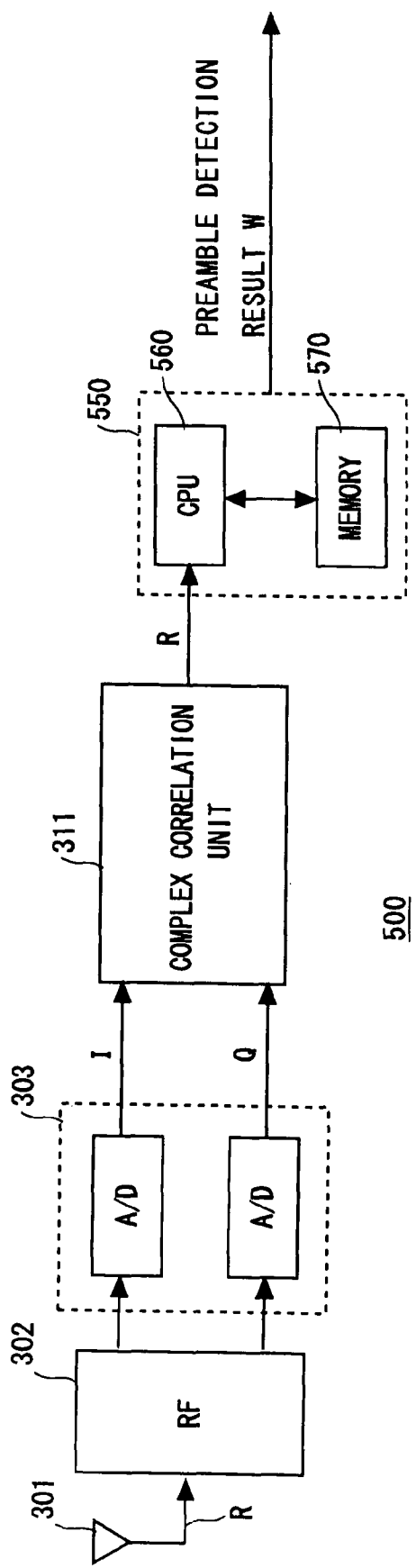
FIG. 10 is a block diagram showing the configuration of a preamble detection apparatus according to another embodiment of the present invention.

FIG. 10 shows a preamble detection apparatus 500, in which the detection execution unit 400 in the preamble detection apparatus 300 of FIG. 1 is configured by a CPU and a memory. In the preamble detection apparatus 500 of FIG. 10, the functional blocks are the same as the corresponding functional blocks in the preamble detection apparatus 300 of FIG. 1 except that a detection execution unit 550 is different from the detection execution unit 400 in the preamble detection apparatus 300 of FIG. 1. Thus, those functional blocks are denoted by the same reference numerals as the corresponding functional blocks in the preamble detection apparatus 300 and not described in detail herein.

The preamble detection apparatus 500 includes the antenna 301, the RF unit 302, the A/D conversion unit 303, the complex correlation unit 311 and the detection execution unit 550. The detection execution unit 550 is composed of a CPU 560 and a memory 570, and has the function of detecting a preamble from a received signal using the correlation results R which are sequentially calculated and output from the complex correlation unit 311. Such a function is implemented by the CPU 560 reading a program that is stored in the memory 570 and executing the same.

The processing of the detection execution unit 550 is described hereinafter with reference to FIGS. 11 to 16. In the following description, the terms "correlation result" and "error detection number threshold" are used in the same meaning as those used in the description of the preamble detection apparatus 300 shown in FIG. 1 and they are denoted by the same reference symbols. The detection execution unit 550 uses seven variables: a correlation peak value P, an error detection threshold err_thr, a preamble detection threshold det_thr, an error detection number counter err_cnt, a first preamble determination flag flag1, a second preamble determination flag flag2, and a preamble detection result W. These variables have the same meaning as the correlation peak value P, the error detection threshold N, the preamble detection threshold D, the output of the error detection number counter 701, the first preamble determination flag, the second preamble determination flag, and the preamble detection result W, respectively, which are used in the description of the preamble detection apparatus 300. Further, the periods are the same as those shown in FIGS. 4 and 5. In addition, a program which is used by the CPU 560 includes an internal self-running timer, which is indicated as "timer" in FIG. 11.

Figure 11:
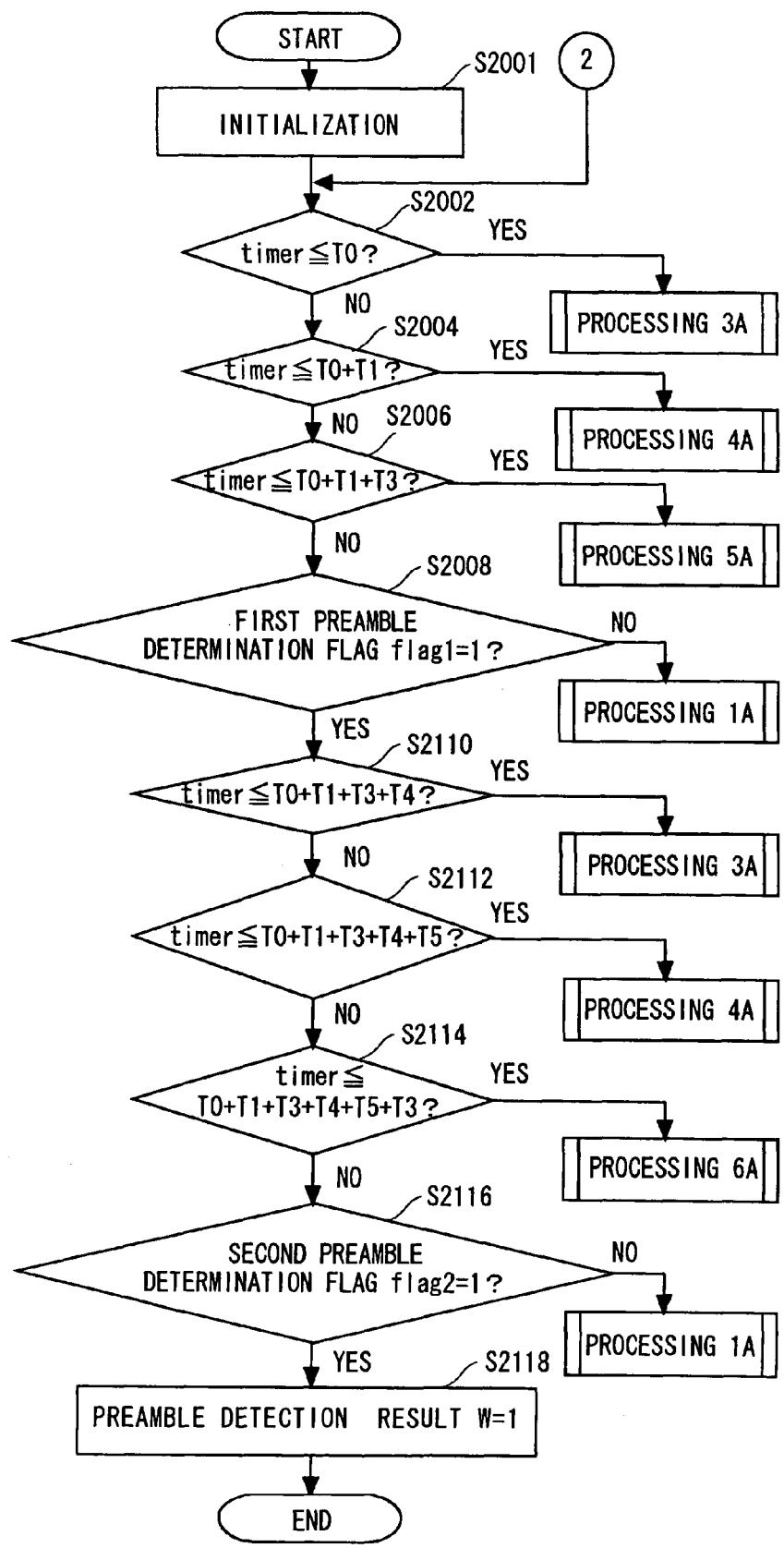
FIG. 11 is a first flowchart showing the process flow in the preamble detection apparatus of FIG. 10.

FIG. 11 is a flowchart showing the processing of the detection execution unit 550. In the process of detecting a preamble, the CPU 560 first performs initialization (S2001). The initialization processing sets the above-described variables and timer to "0".

After the initialization processing, the CPU 560 checks the timer to determine if it is the first error detection determination delay period T0 (S2002). If the timer indicates T0 or below, which means the first error detection determination delay period T0 (YES in S2002), the CPU 560 executes the processing 3A.

Figure 12:
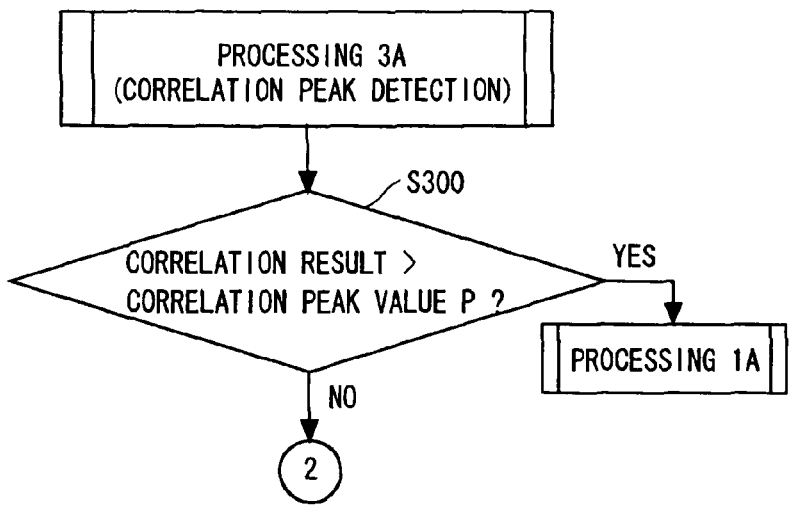
FIG. 12 is a second flowchart showing the process flow in the preamble detection apparatus of FIG. 10.

FIG. 12 shows the processing 3A. This processing is correlation peak detection processing on the current correlation peak value P. Specifically, it compares the current correlation result R with the correlation peak value P. If the current correlation result R is equal to or smaller than the correlation peak value P, the process returns to Step S2002 so as to continue to process the next correlation result R. If, on the other hand, the current correlation result R is larger than the correlation peak value P, the process proceeds to the processing 1A.

Figure 13:
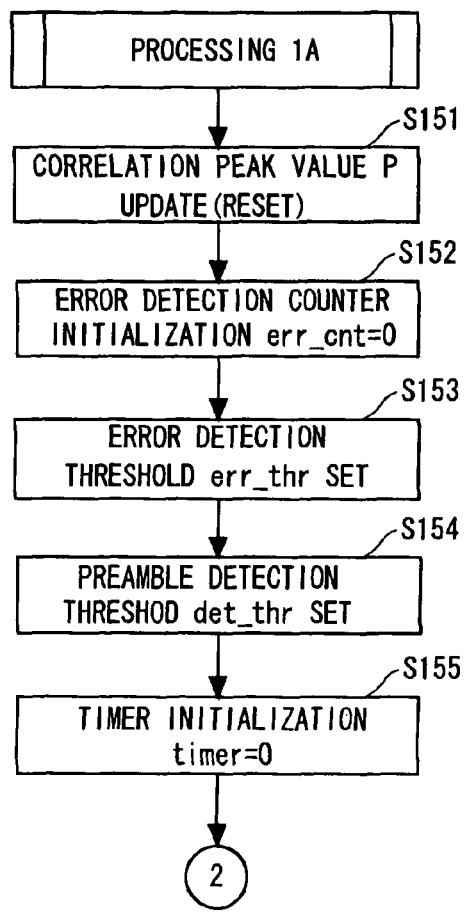
FIG. 13 is a third flowchart showing the process flow in the preamble detection apparatus of FIG. 10.

FIG. 13 shows the processing 1A. In this processing, the process updates the correlation peak value P to the correlation result R (S151), initializes the error detection number counter err_cnt (S152), and updates the error detection threshold err_thr to a value which is obtained by multiplying a new correlation peak value P by the coefficient α (S153). Further, it updates the preamble detection threshold det_thr to a value which is obtained by multiplying the new correlation peak value P by the coefficient β and then initializes the timer to "0".

After that, the process returns to Step S2002 so as to determine whether the new correlation peak value P is a symbol timing or not.

Although the update of the correlation peak value P in Step S151 means updating the current correlation peak value P to a larger correlation result R, it means resetting the correlation peak value P when error detection is determined in the processing 4A, which is described later.

Referring back to the flowchart of FIG. 11, if the timer indicates a value which is larger than T0, indicating that it is not the first error detection determination delay period T0, in Step S2002, whether it is the first error detection determination period T1 or not is checked (NO in S2002, S2004). This checking is based on whether the timer indicates the sum of the length of T0 and the length of T1 or below. The fact that the current processing is in the first error detection determination period T1 means that the correlation result R which is larger than the correlation peak value P does not exist in the first error detection determination delay period T0 on the basis of the correlation peak value P.

Figure 14:
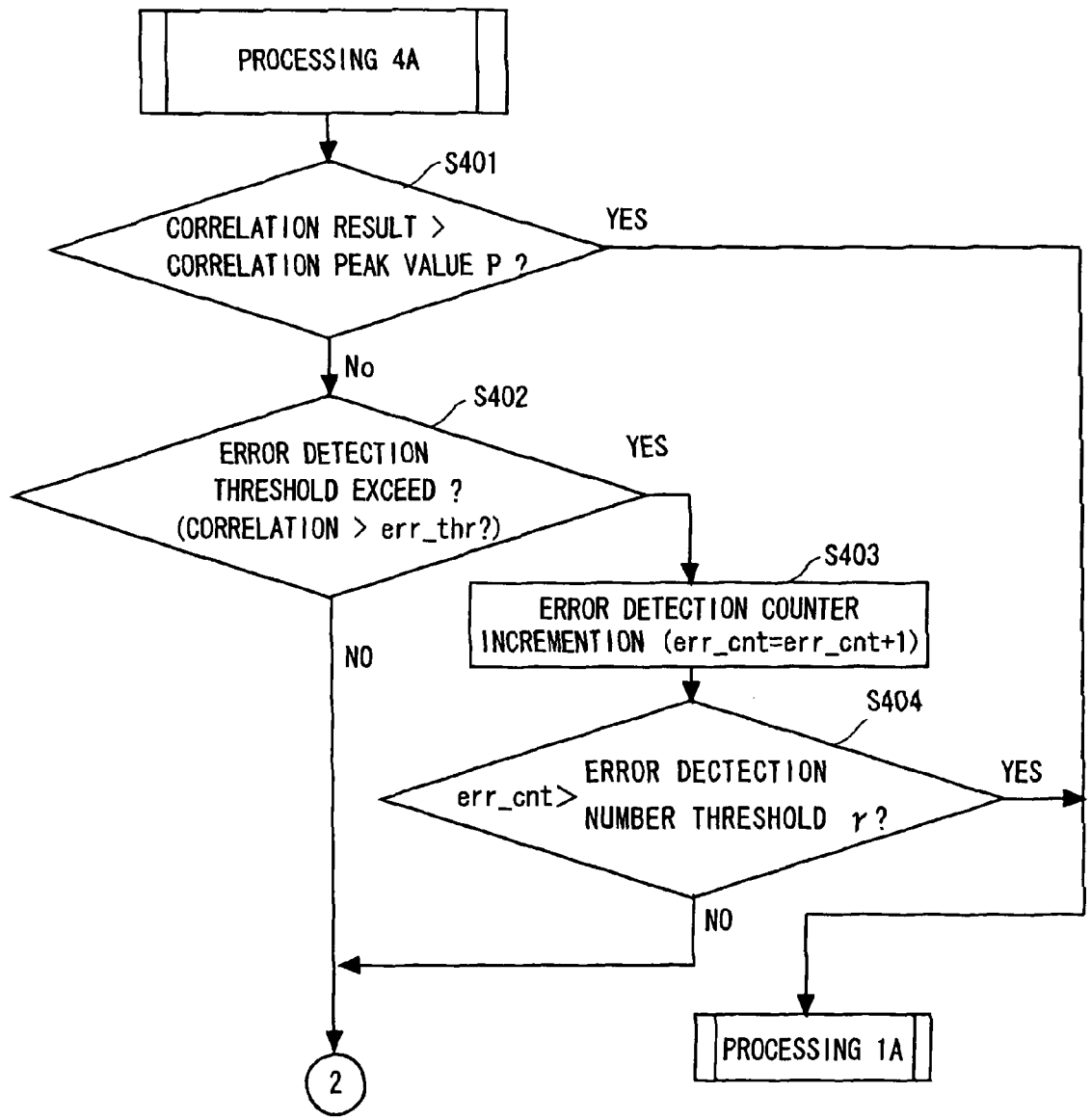
FIG. 14 is a fourth flowchart showing the process flow in the preamble detection apparatus of FIG. 10.

FIG. 14 shows the processing in the first error detection determination period T1. As shown in FIG. 14, the process first determines whether the correlation result R is larger than the correlation peak value P or not. If the correlation result R is larger than the correlation peak value P, the process performs the processing 1A, which is described earlier (YES in S401). On the other hand, if the correlation result R is equal to or less than the correlation peak value P, the process determines whether the correlation result R is larger than the error detection threshold err_thr (NO in S401, S402).

If the correlation result R is larger than the error detection threshold err_thr, the error detection number counter err_cnt is incremented by one (YES in S402, S403). If the incremented error detection number counter err_cnt is larger than the error detection number threshold γ (YES in S404), the process performs the processing 1A. In this case, the update of the correlation peak value P in the processing 1A means reset.

On the other hand, if the error detection number counter err_cnt is equal to or smaller than the error detection number threshold γ (NO in S404), the process returns to Step S2002 without making any change to the variables.

Further, in Step S402, if the correlation result R is equal to or smaller than the error detection threshold err_thr (NO in S402), the process returns to Step S2002 so as to process the next correlation result R.

Accordingly, the correlation peak detection processing is performed in the first error detection determination period T1 and, if the correlation peak value P is updated, it is determined whether the new correlation peak value P is a symbol timing or not. Further, if the number of occurrences of the correlation result R which exceeds the error detection number counter err_cnt is larger than the error detection number threshold γ in the first error detection determination period T1, it is determined that the current correlation peak value P is not a symbol timing, and it is reset. Then, the correlation peak detection processing is repeated from the state immediately after the initialization.

Referring back to the flowchart of FIG. 11, if the correlation peak value P is determined as a symbol timing after the first error detection determination period T1, the process proceeds to the preamble determination period T3 so as to perform the first preamble determination (NO in S2002, NO in S2004, YES in S2006). In this period, the timer indicates a value which is larger than the sum of the length of the first error detection determination delay period T0 and the length of the first error detection determination period T1 and which is equal to or smaller than the sum of the length of the first error detection determination delay period T0, the length of the first error detection determination period T1, and the length of the preamble determination period T3.

Figure 15:
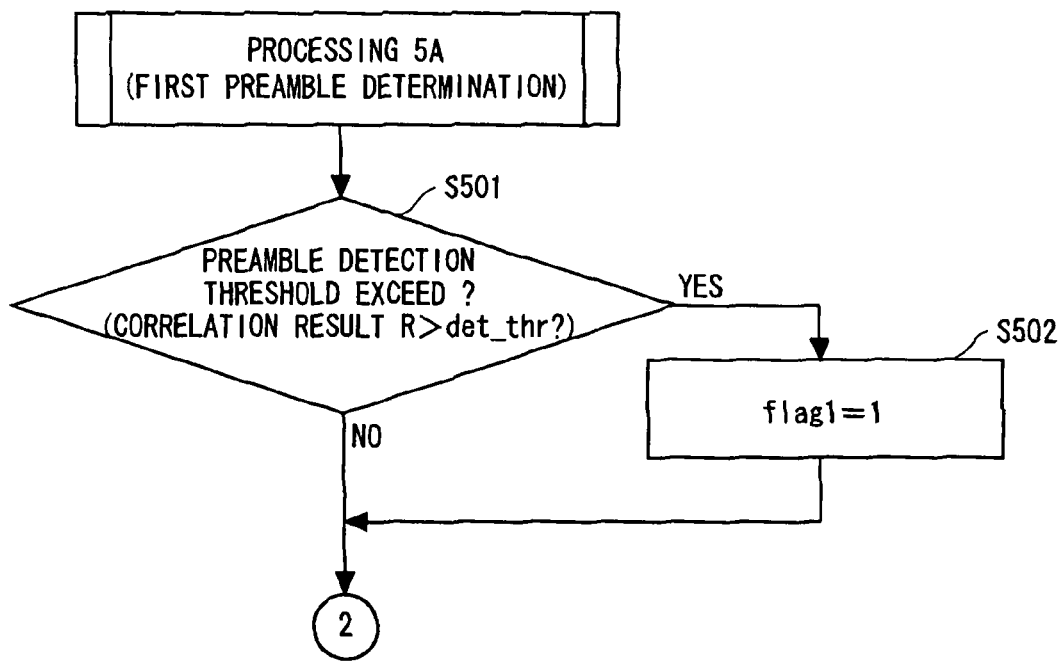
FIG. 15 is a fifth flowchart showing the process flow in the preamble detection apparatus of FIG. 10.

FIG. 15 shows the processing in the first preamble determination period T3. In this period, the process compares the correlation result R with the preamble detection threshold det_thr. If there is the correlation result R which exceeds the preamble detection threshold det_thr, the first preamble determination flag flag1 is set to "1" indicating success in the first preamble determination (YES in S501, S502). On the other hand, if there is no correlation result R which exceeds the preamble detection threshold det_thr in this period, the first preamble determination flag flag1 remains "0" indicating failure in the first preamble determination, and the first preamble determination period T3 ends.

After that, as shown in FIG. 11, the state of the first preamble determination flag flag1 is checked (NO in S2002, NO in S2004, NO in S2006 and S2008), and different processing is performed according to the checking result.

In Step S2008, if the first preamble determination flag flag1 is "0" (NO in S2008), the process performs the processing 1A and further repeats the correlation peak detection processing from the state that is immediately after the initialization.

On the other hand, if the first preamble determination flag flag1 is "1" indicating success in the first preamble determination (YES in S2008), the process proceeds to Step S2110 so as to perform the processing in the second symbol timing determination period T6 before the second preamble determination period. As shown in FIG. 5, the second symbol timing determination period T6 is composed of the second error detection determination delay period T4 and the second error detection determination period T5.

In Step S2110, the process first determines whether it is within the second error detection determination delay period T4 or not. In this period, the timer indicates a value which is larger than the sum of the length of the first error detection determination delay period T0, the length of the first error detection determination period T1, and the length of the preamble determination period T3 and which is equal to or smaller than the sum of the length of the first error detection determination delay period T0, the length of the first error detection determination period T1, the length of the preamble determination period T3, and the length of the second error detection determination delay period T4. If it is during the second error detection determination delay period T4, the above-described processing 3A is performed (YES in S2112). If, on the other hand, the second error detection determination delay period T4 already ends (NO in S2112), the process proceeds to the second error detection determination period T5 to perform the processing 4A.

Figure 16:
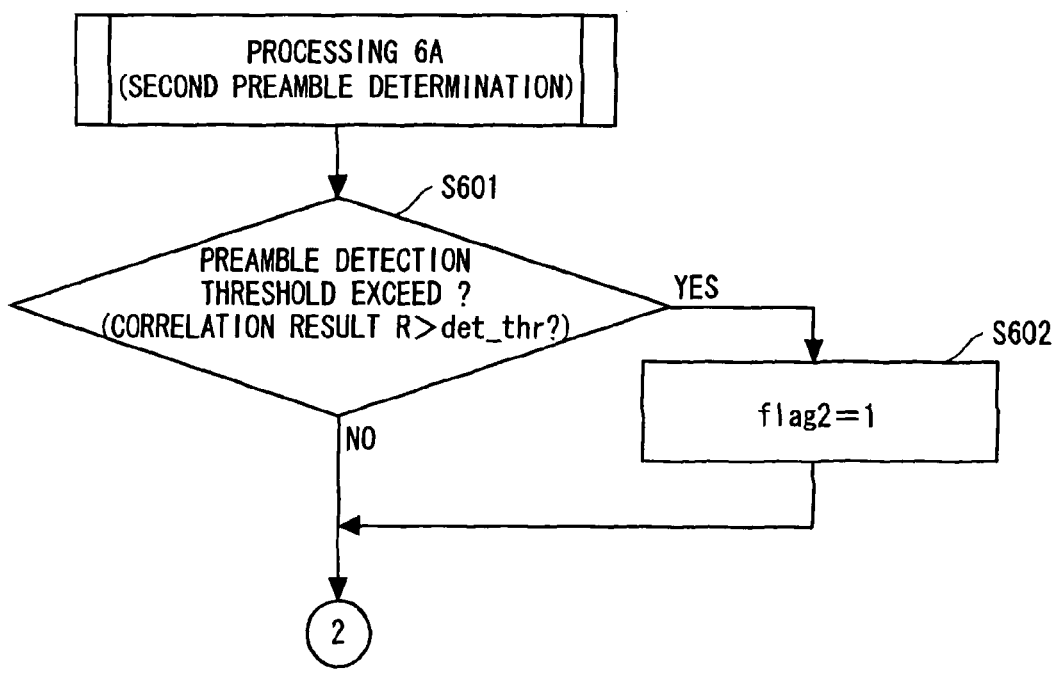
FIG. 16 is a sixth flowchart showing the process flow in the preamble detection apparatus of FIG. 10.
Figure 17:
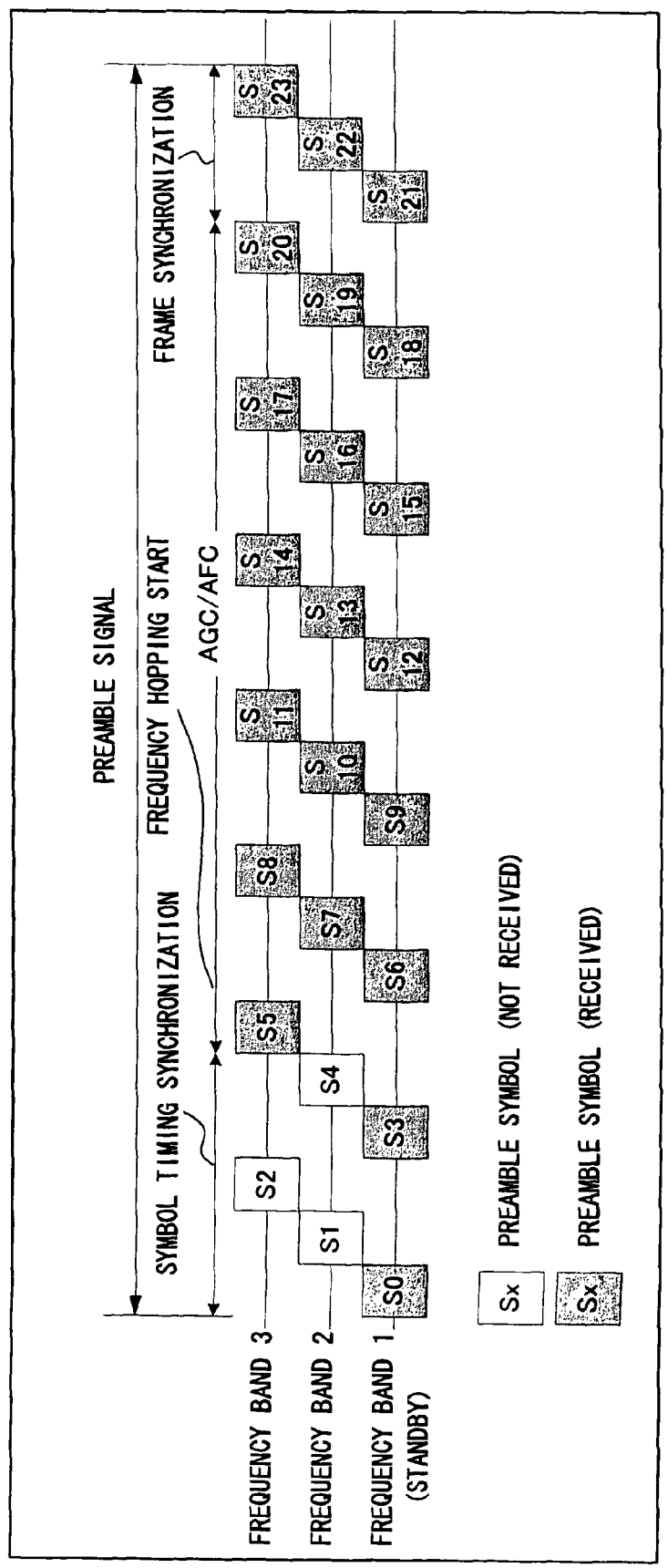
FIG. 17 is a view to describe a preamble in MB-OFDM.
Figure 18:
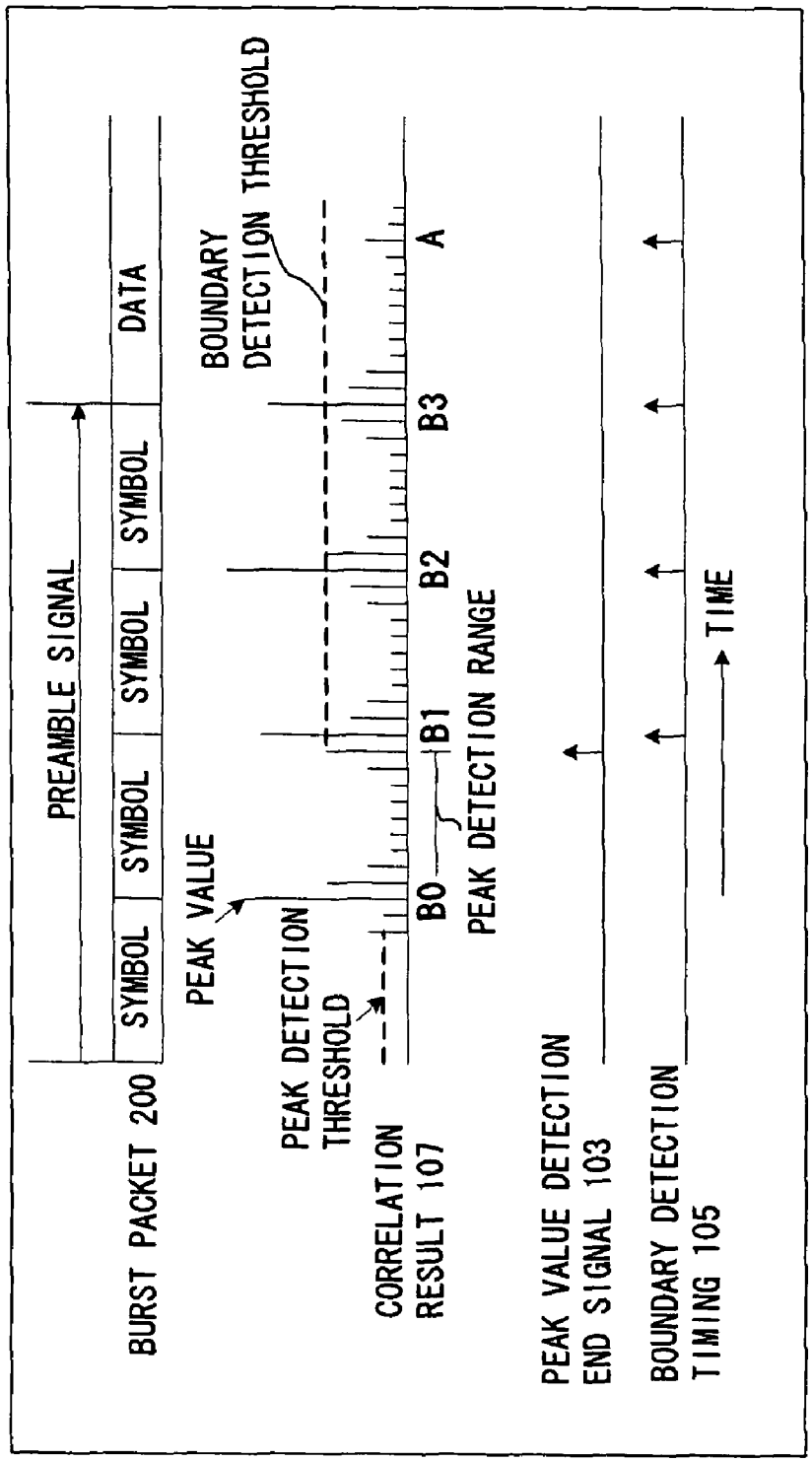
FIG. 18 is a view to describe a preamble detection method according to a related art.
Figure 19:
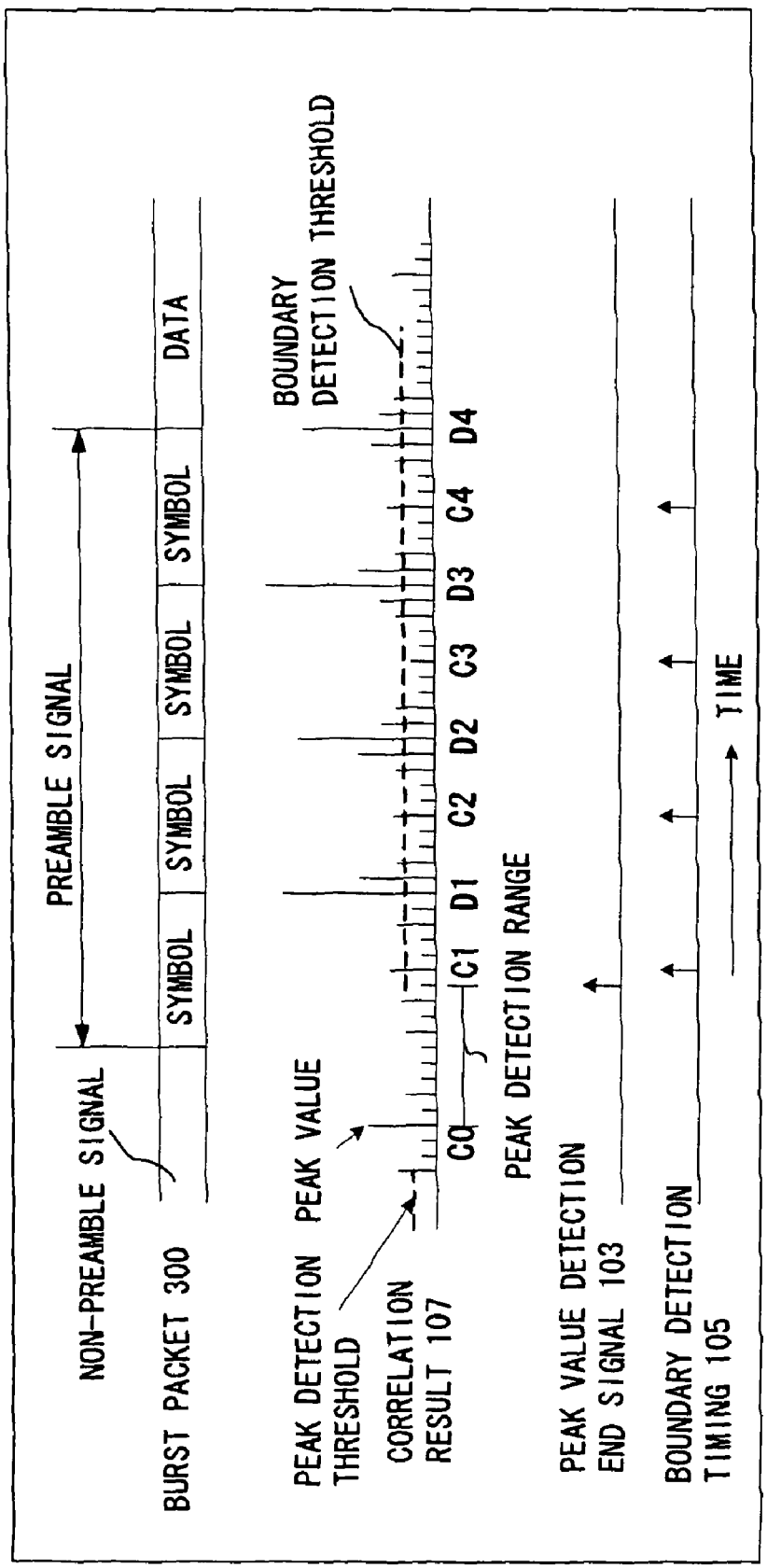
FIG. 19 is a view to describe a problem in the related art.

If the correlation result R which is larger than the correlation peak value P does not exist in the second symbol timing determination period T6 and the number of occurrences of the correlation result R which is larger than the error detection threshold err_thr is equal to or smaller than the error detection number threshold γ in the second error detection determination period T5, the process proceeds to the second preamble determination (processing 6A). In the period of the second preamble determination, the timer indicates a value which is larger than the sum of the length of the first error detection determination delay period T0, the length of the first error detection determination period T1, the length of the preamble determination period T3, the length of the second error detection determination delay period T4, and the length of the second error detection determination period T5 and which is equal to or smaller than the sum of the length of the first error detection determination delay period T0, the length of the first error detection determination period T1, the length of the first preamble determination period T3, the length of the second error detection determination delay period T4, the length of the second error detection determination period T5, and the length of the second preamble determination period T3 (YES in S2114). FIG. 16 shows the second preamble determination or the processing 6A. Because the other processing, such as upon failure of determination, is the same as the first preamble determination or the processing 5A except that it sets the second preamble determination flag flag2 to "1" upon success of determination, the detailed description is not provided herein.

Finally, if both of the two preamble determination flags are "1" (YES in S2116), the process determines that a preamble is detected, and it outputs "1" as the preamble detection result W.

The preamble detection apparatus 500 shown in FIG. 10 implements the processing of the detection execution unit 400 in the preamble detection apparatus 300 shown in FIG. 1 by executing software on a processor, thereby producing the same effect as the preamble detection apparatus 300.

It is apparent that the present invention is not limited to the above embodiments, but may be modified and changed without departing from the scope and spirit of the invention.

What is claimed is:

1. A symbol timing detection method as executed in a processor upon detecting a symbol timing from a received signal composed of a packet having a preamble with periodically allocated symbols placed at a head of data, said method comprising:
performing, in a correlation unit provided, processing to sequentially obtain correlation results indicating a correlation between the received signal and a fixed pattern of the preamble;
performing, in a correlation peak detection unit, correlation peak detection processing to update and hold a maximum value in the correlation results; and
performing, in a symbol timing determination unit, symbol timing determination processing to determine a timing of the maximum value as a symbol timing on a condition that a maximum value currently held by the correlation peak detection unit is not updated in a symbol timing determination period having a predetermined length from the timing and that a number of occurrences of a correlation result exceeding an error detection determination threshold is smaller than a predetermined number in an error detection determination period defined within the symbol timing determination period.

2. The symbol timing detection method according to claim 1, wherein the error detection determination threshold is a value obtained by multiplying the maximum value by a coefficient α (0<α<1).

3. The symbol timing detection method according to claim 1, wherein the error detection determination period is set at a predetermined distance from a timing of the maximum value.

4. A preamble detection method comprising executing detection of a preamble by confirming a periodicity of a symbol in a periodicity confirmation window opened in accordance with a symbol length on a basis of a symbol timing detected by the symbol timing detection method according to claim 1.

5. The preamble detection method according to claim 4, wherein the periodicity is confirmed if there is a correlation result larger than a predetermined preamble detection threshold in the periodicity confirmation window.

6. The preamble detection method according to claim 5, wherein the preamble detection threshold is a value obtained by multiplying the maximum value at the symbol timing by a coefficient $\beta$ ($0<\beta<1$).

7. The preamble detection method according to claim 4, wherein, if the periodicity confirmation fails, the correlation peak detection processing is performed beginning at its point, and the symbol timing determination processing is performed on a maximum value of a newly obtained correlation result.

8. The preamble detection method according to claim 4, wherein a preamble is detected on a condition that the periodicity is confirmed a plurality of times in succession.

9. A symbol timing detection apparatus to detect a symbol timing from a received signal composed of a packet having a preamble with periodically allocated symbols placed at a head of data, said apparatus comprising:
   a correlation unit to sequentially obtain correlation results indicating a correlation between the received signal and a fixed pattern of the preamble;
   a correlation peak detection unit to perform correlation peak detection processing to update and hold a maximum value in the correlation results; and
   a symbol timing determination unit to determine a timing of the maximum value as the symbol timing on a condition that a maximum value currently held by the correlation peak detection unit is not updated in a symbol timing determination period having a predetermined length from the timing and that a number of occurrences of a correlation result exceeding an error detection determination threshold is smaller than a predetermined number in an error detection determination period defined within the symbol timing determination period.

10. The symbol timing detection apparatus according to claim 9, wherein the error detection determination threshold is a value obtained by multiplying the maximum value by a coefficient $\beta$ ($0<\beta<1$).

11. The symbol timing detection apparatus according to claim 9, wherein the error detection determination period is set at a predetermined distance from the timing of the maximum value.

12. The symbol timing detection apparatus according to claim 9, wherein the symbol timing determination unit includes:
   an error detection determination section configured to count the number of occurrences of a correlation result exceeding the error detection determination threshold in the error detection determination period and provide error detection notification when the number of occurrences exceeds the predetermined number; and
   a symbol timing detection control section configured to check whether there is an update of the maximum value and determine the maximum value as a symbol timing when the maximum value is not updated in the symbol timing determination period and when error detection notification is not provided from the error detection determination section in the error detection determination period, to make control so as to check whether there is a further update and perform processing by the error detection determination section on an updated maximum value when the maximum value is updated, and to reset a maximum value currently held by the correlation peak detection unit and make control so as to check whether there is an update and perform processing by the error detection determination section on a maximum value detected by the correlation peak detection unit after a reset when the error detection notification is provided from the error detection determination section.

13. A preamble detection apparatus, comprising:
   the symbol timing detection apparatus according to claim 9;
   a periodicity confirmation unit to confirm a periodicity of a symbol in a periodicity confirmation window opened in accordance with a symbol length on a basis of a symbol timing detected by the symbol timing detection apparatus; and
   a preamble detection control unit to determine that a preamble is detected if the periodicity confirmation unit confirms the periodicity.

14. The preamble detection apparatus according to claim 13, wherein the periodicity confirmation unit confirms the periodicity if there is a correlation result larger than a predetermined preamble detection threshold in the periodicity confirmation window.

15. The preamble detection apparatus according to claim 14, wherein the preamble detection threshold is a value obtained by multiplying the maximum value at the symbol timing by a coefficient $\beta$ ($0<\beta<1$).

16. The preamble detection apparatus according to claim 13, wherein the preamble detection control unit resets a maximum value currently held by the correlation peak detection unit and makes a control so as to perform processing by the symbol timing detection apparatus on a maximum value detected by the correlation peak detection unit after a reset when a confirmation by the periodicity confirmation unit fails.

17. The preamble detection apparatus according to claim 13, wherein the preamble detection control unit determines that a preamble is detected on a condition that the periodicity is confirmed a plurality of times in succession by the periodicity confirmation unit.

18. A computer program product, in a non-transitory, tangible computer readable medium, including instructions executed by a computer for causing the computer to implement a method upon detecting a symbol timing from a received signal composed of a packet having a preamble with periodically allocated symbols placed at a head of data, the method comprising:
   performing correlation peak detection processing to update and hold a maximum value in correlation results sequentially indicating a correlation between the received signal and a fixed pattern of the preamble; and
   performing symbol timing determination processing to determine a timing of the maximum value as a symbol timing on condition that a maximum value currently held by the correlation peak detection unit is not updated in a symbol timing determination period having a predetermined length from the timing and that a number of occurrences of a correlation result exceeding an error detection determination threshold is smaller than a predetermined number in an error detection determination period defined within the symbol timing determination period.

19. The computer program product according to claim 18, wherein, in the symbol timing determination processing, the error detection determination threshold is obtained by multiplying the maximum value by a coefficient $\alpha$ ($0<\alpha<1$).

20. The computer program product according to claim 18, wherein the error detection determination period is set at a predetermined distance from the timing of the maximum value.

21. The computer program product according to claim 18, the method further comprising performing preamble detection processing by confirming a periodicity of a symbol in a periodicity confirmation window opened in accordance with a symbol length on a basis of the symbol timing.

* * * * *